Dec. 9, 1941.  W. T. GOLLWITZER  2,265,229
MEANS FOR PREPARING PRINTING AND CONTROL DEVICES
Filed May 31, 1938  16 Sheets-Sheet 1
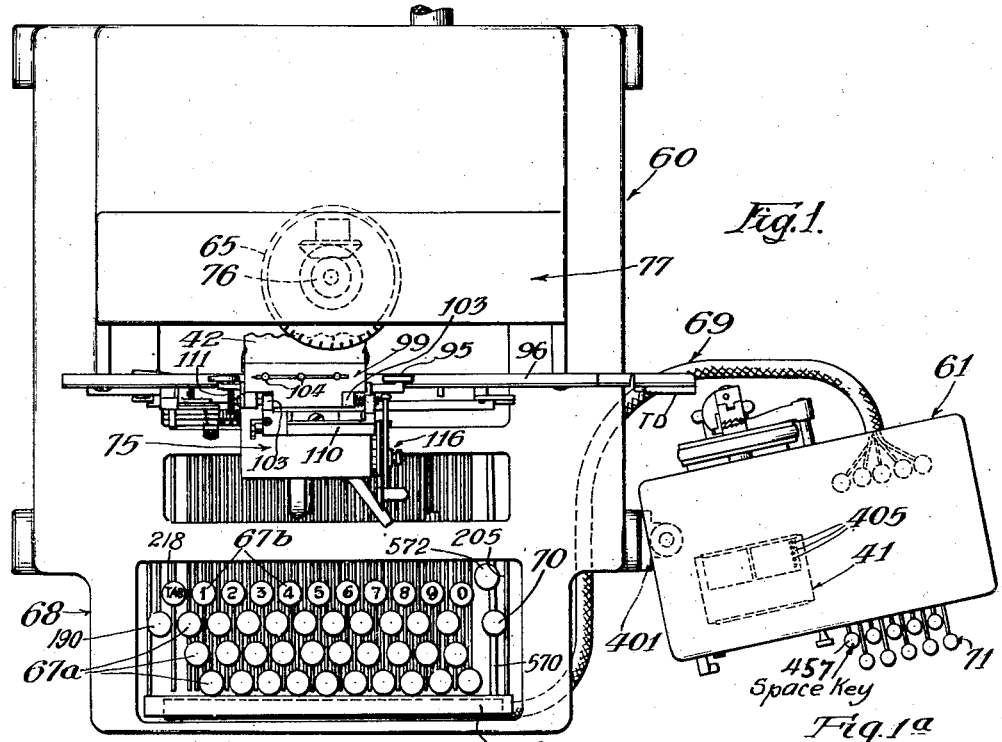
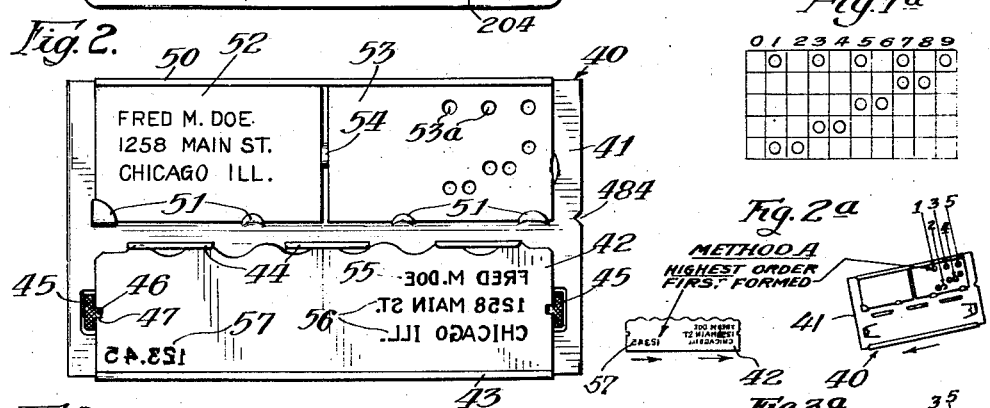
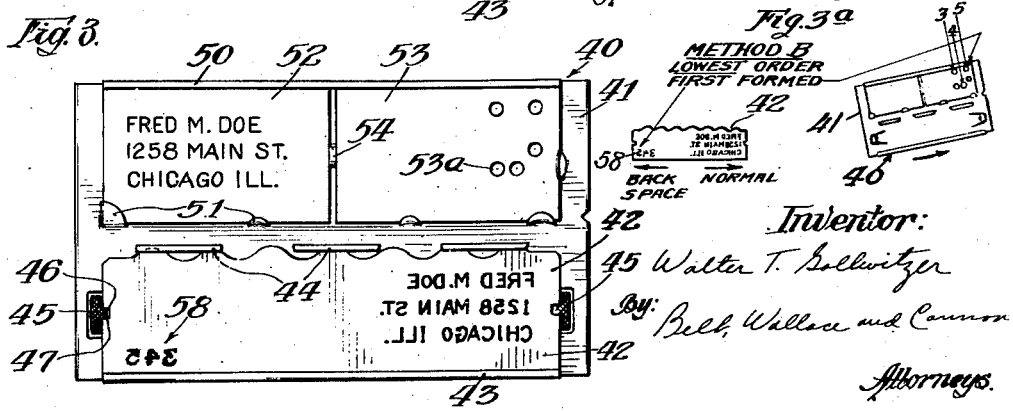

Dec. 9, 1941.   W. T. GOLLWITZER   2,265,229
MEANS FOR PREPARING PRINTING AND CONTROL DEVICES
Filed May 31, 1938   16 Sheets-Sheet 2
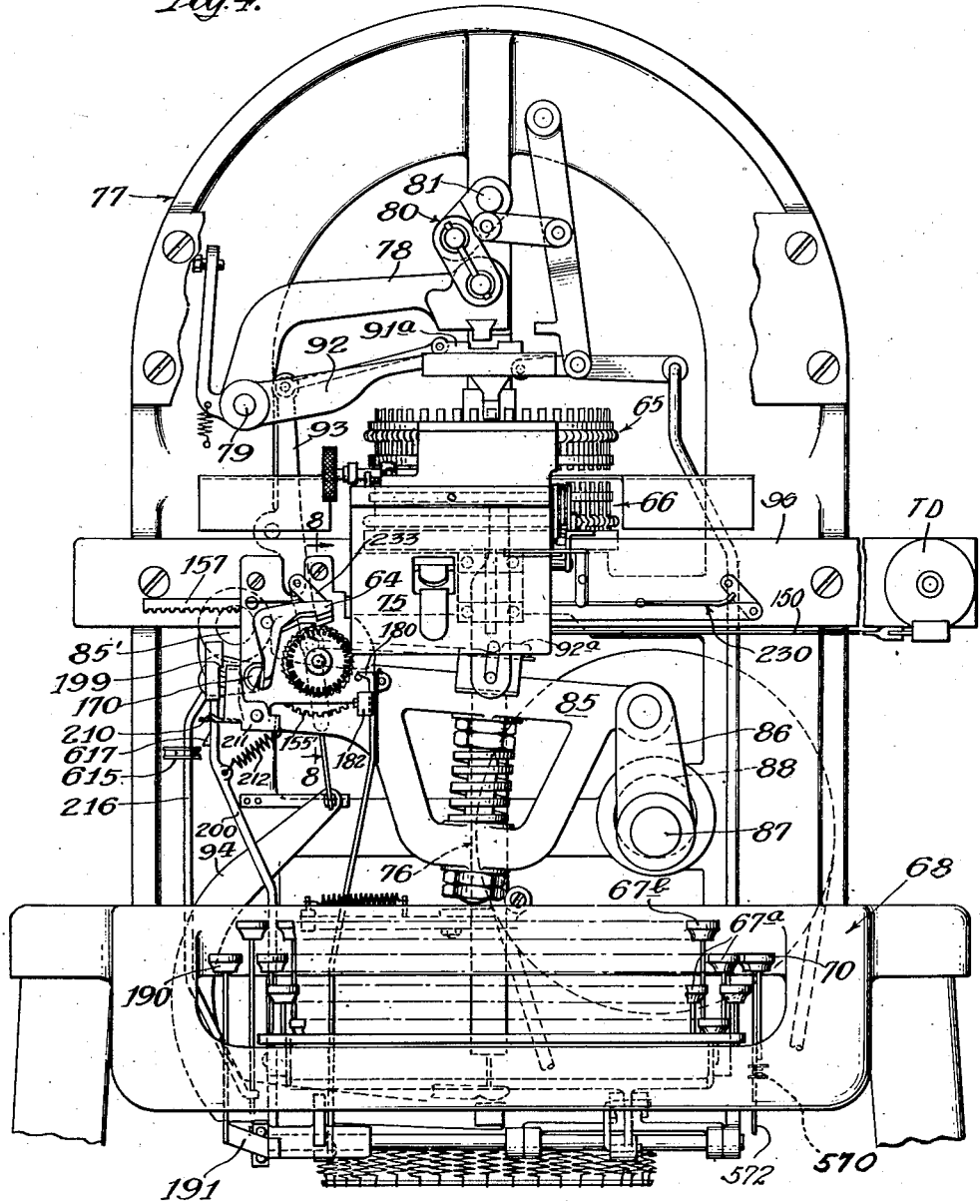

Dec. 9, 1941.  W. T. GOLLWITZER  2,265,229
MEANS FOR PREPARING PRINTING AND CONTROL DEVICES
Filed May 31, 1938  16 Sheets-Sheet 3

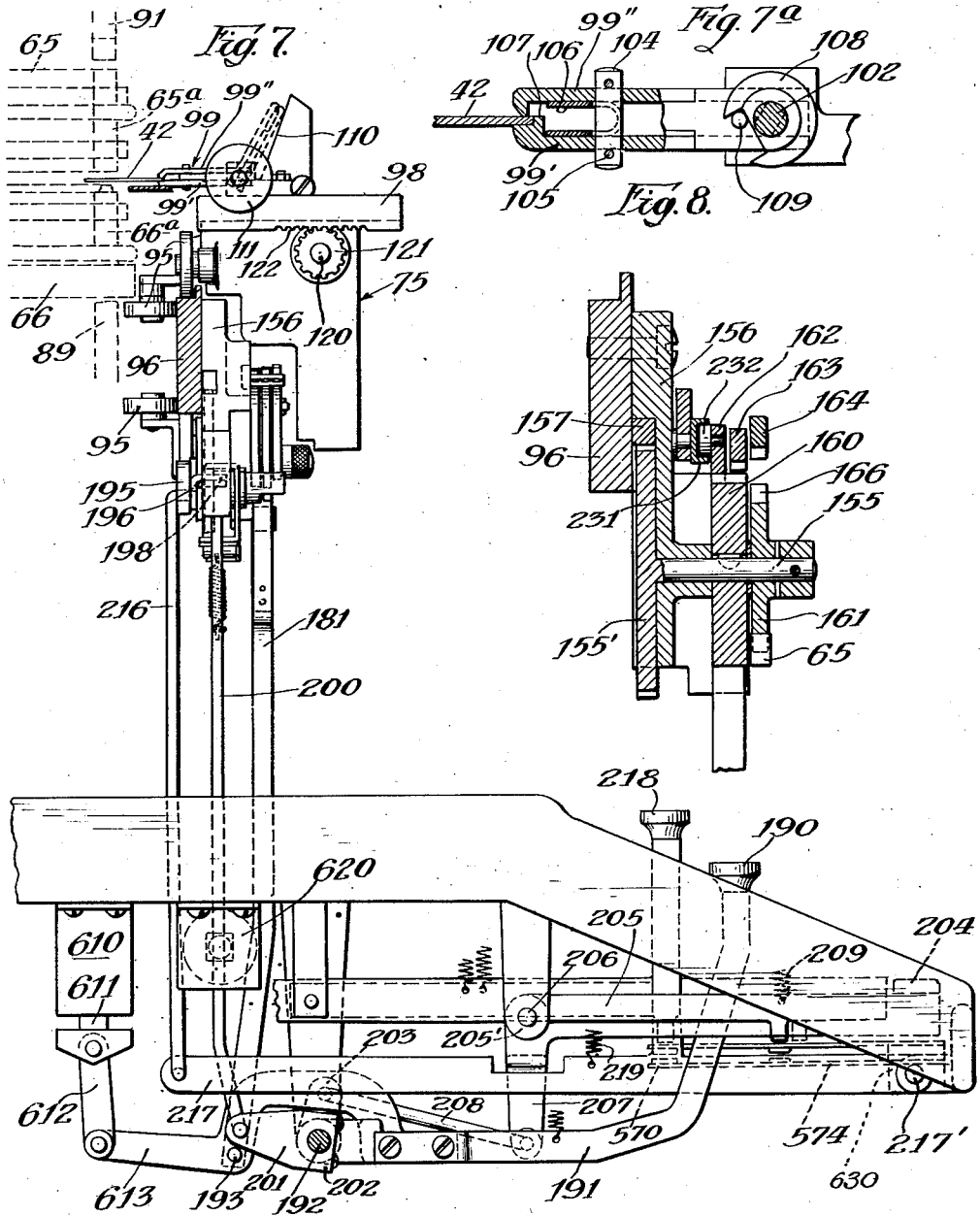

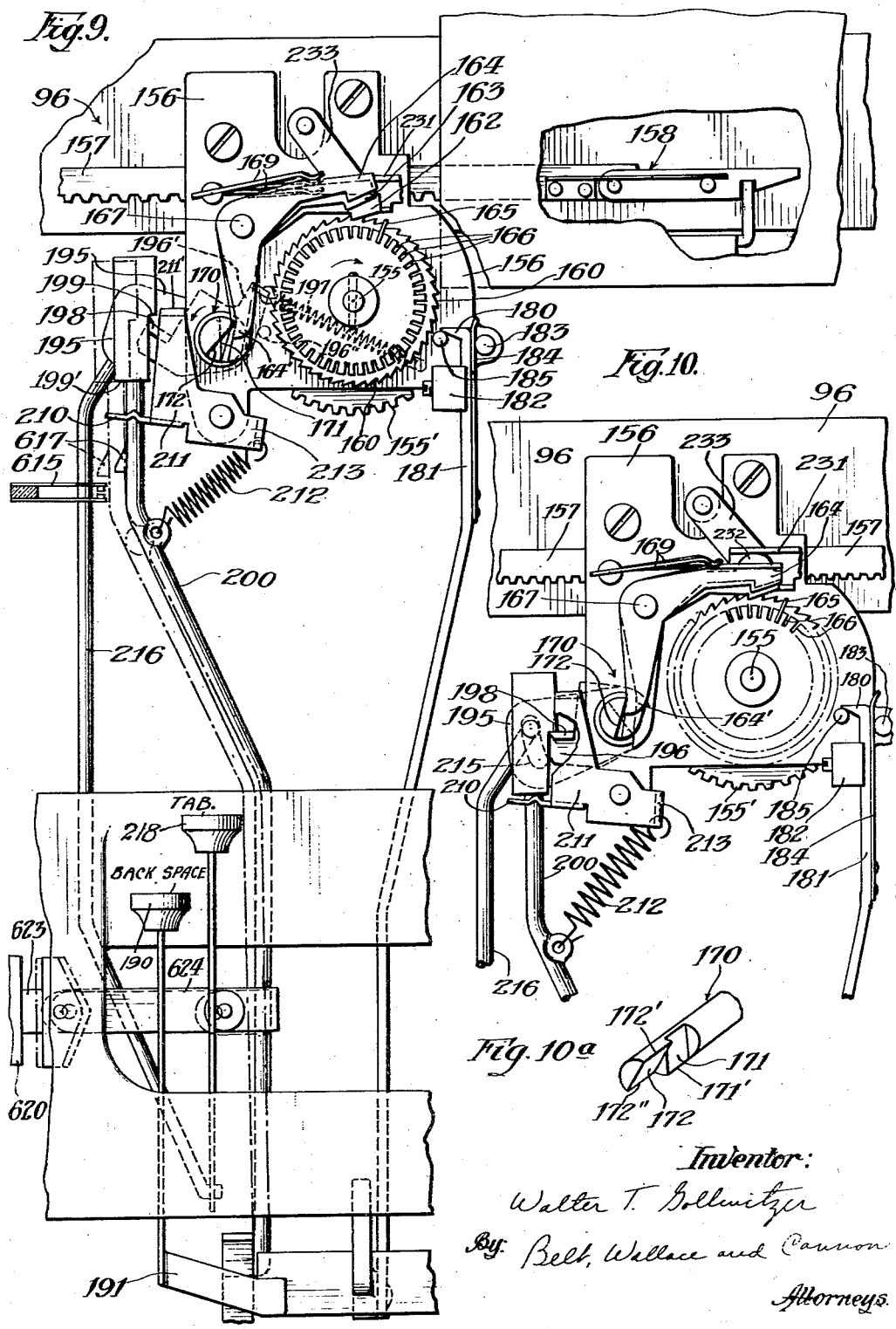

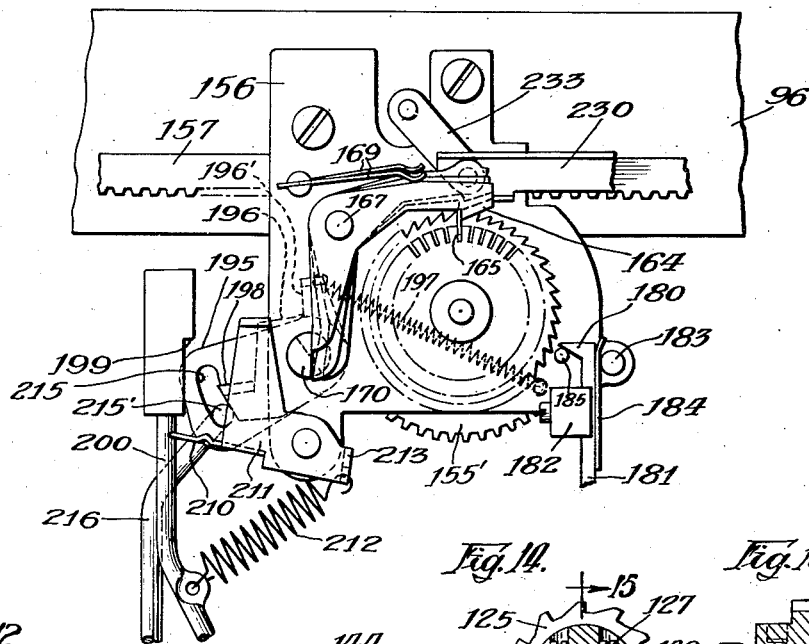

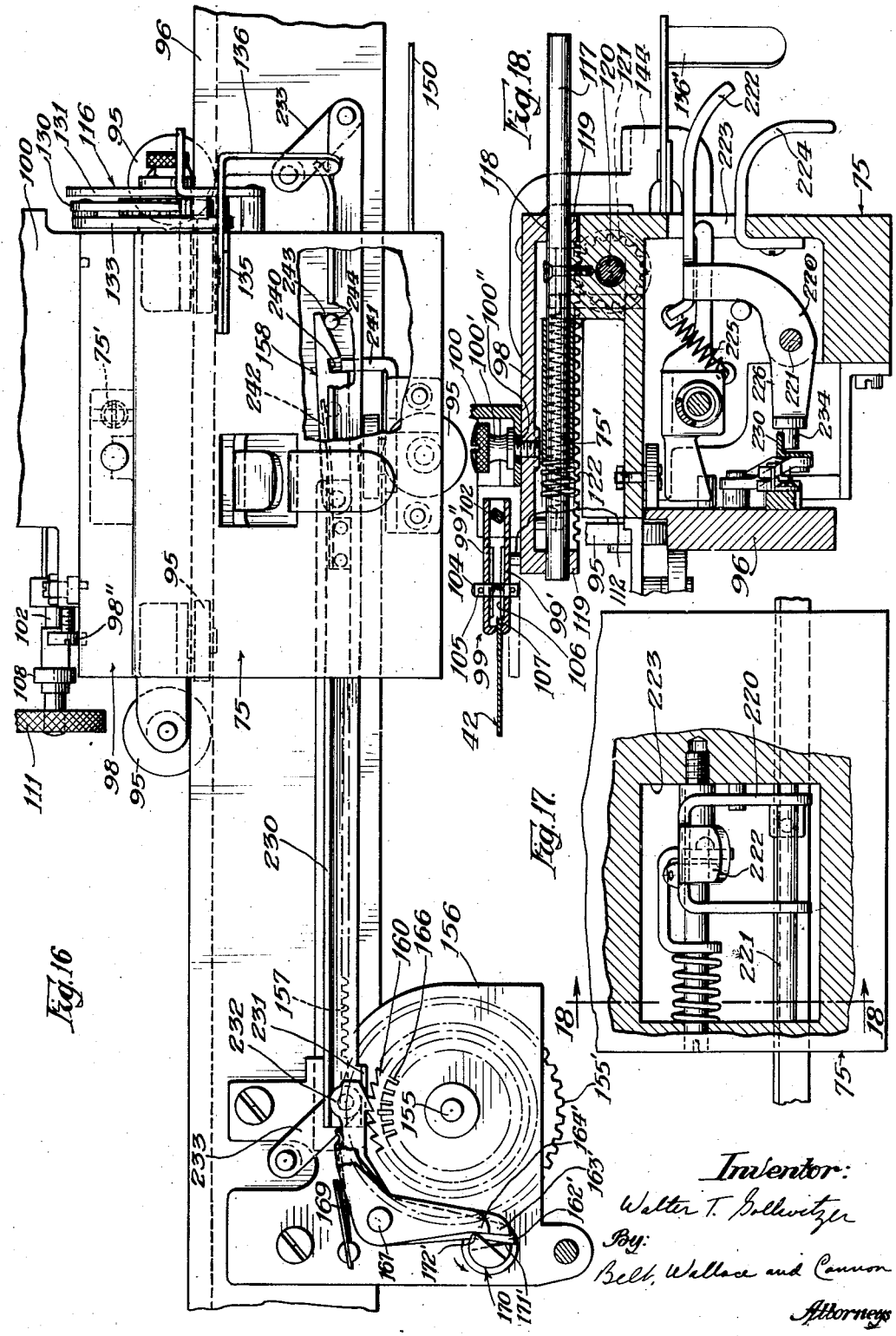

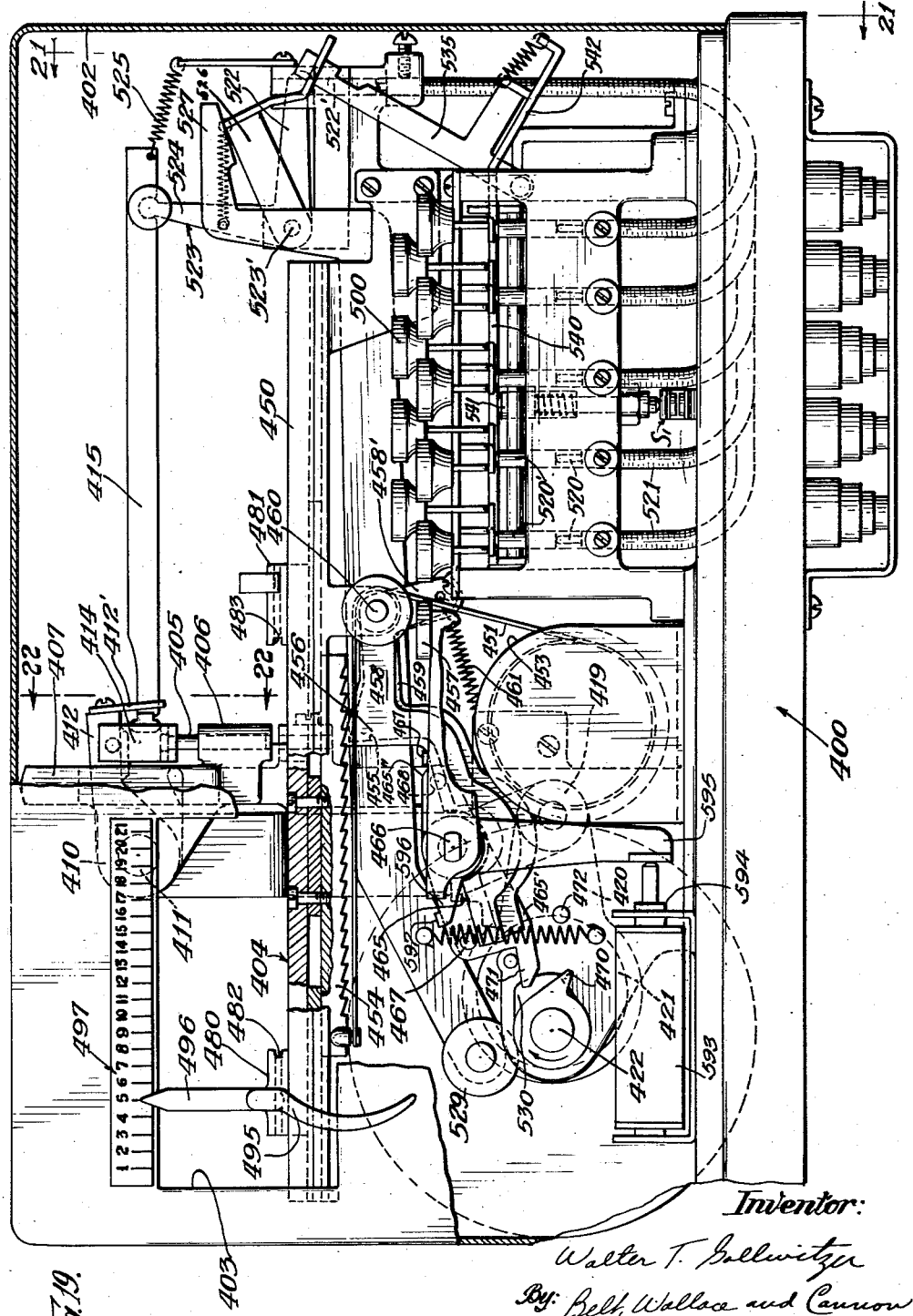

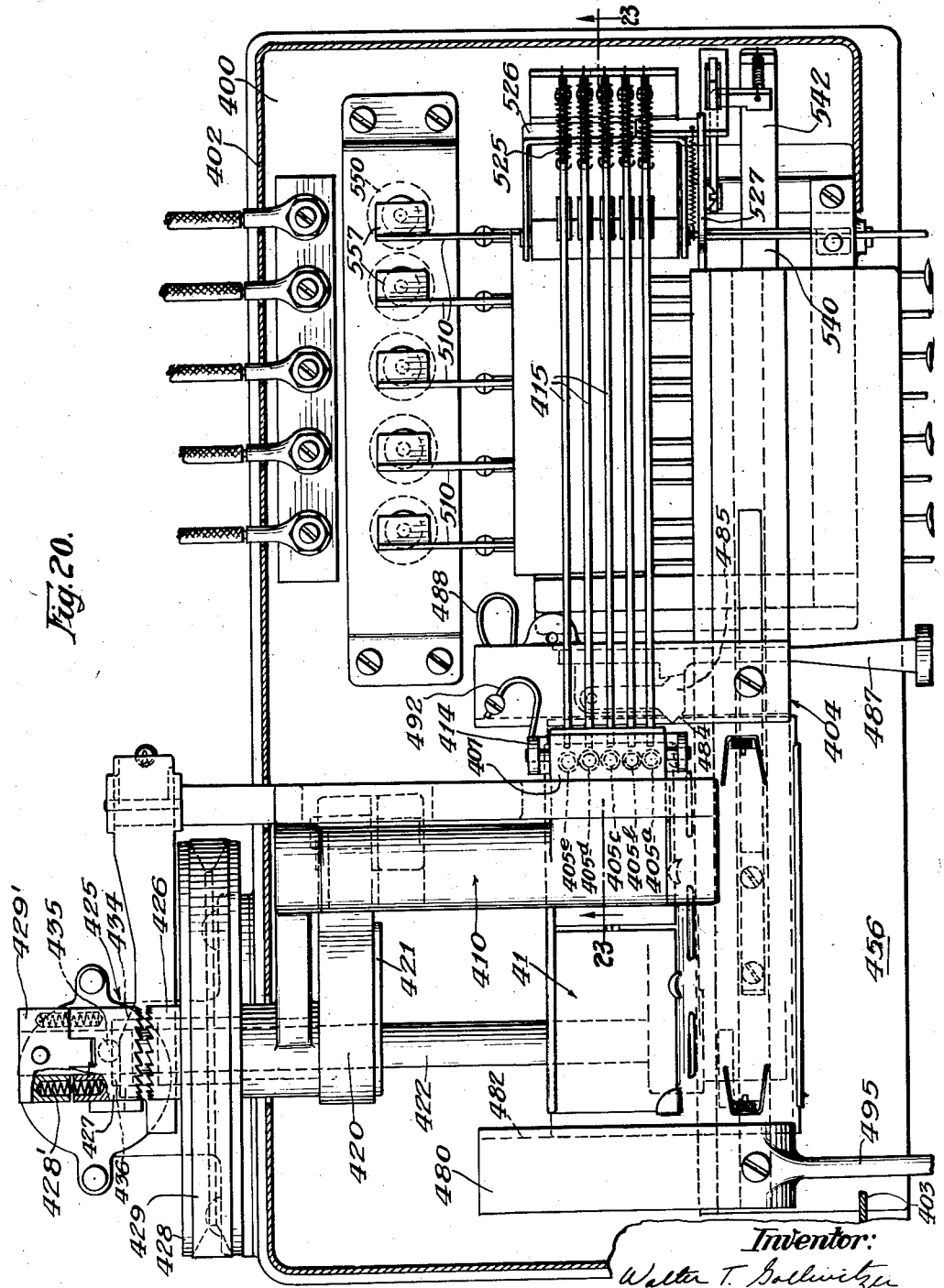

Inventor:
Walter T. Gollwitzer
By:
Bell, Wallace and Cannon
Attorneys.

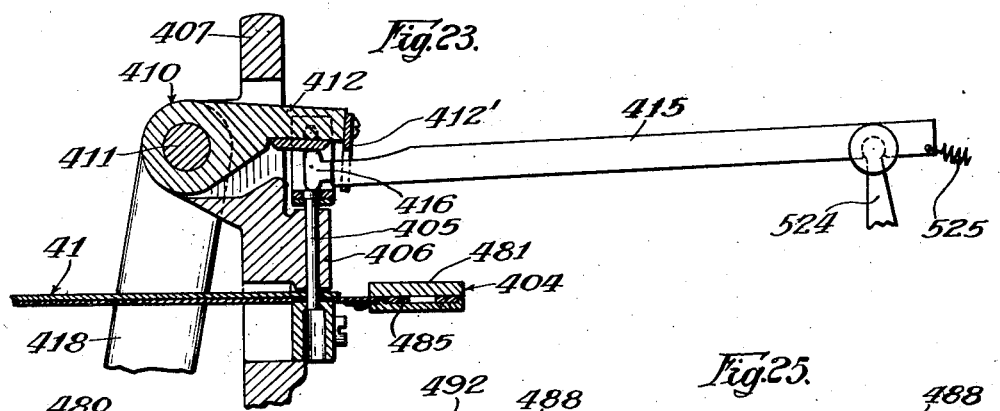

Dec. 9, 1941.   W. T. GOLLWITZER   2,265,229
MEANS FOR PREPARING PRINTING AND CONTROL DEVICES
Filed May 31, 1938    16 Sheets-Sheet 12

Inventor:
Walter T. Gollwitzer
By Belt, Wallace and Cannon
Attorneys

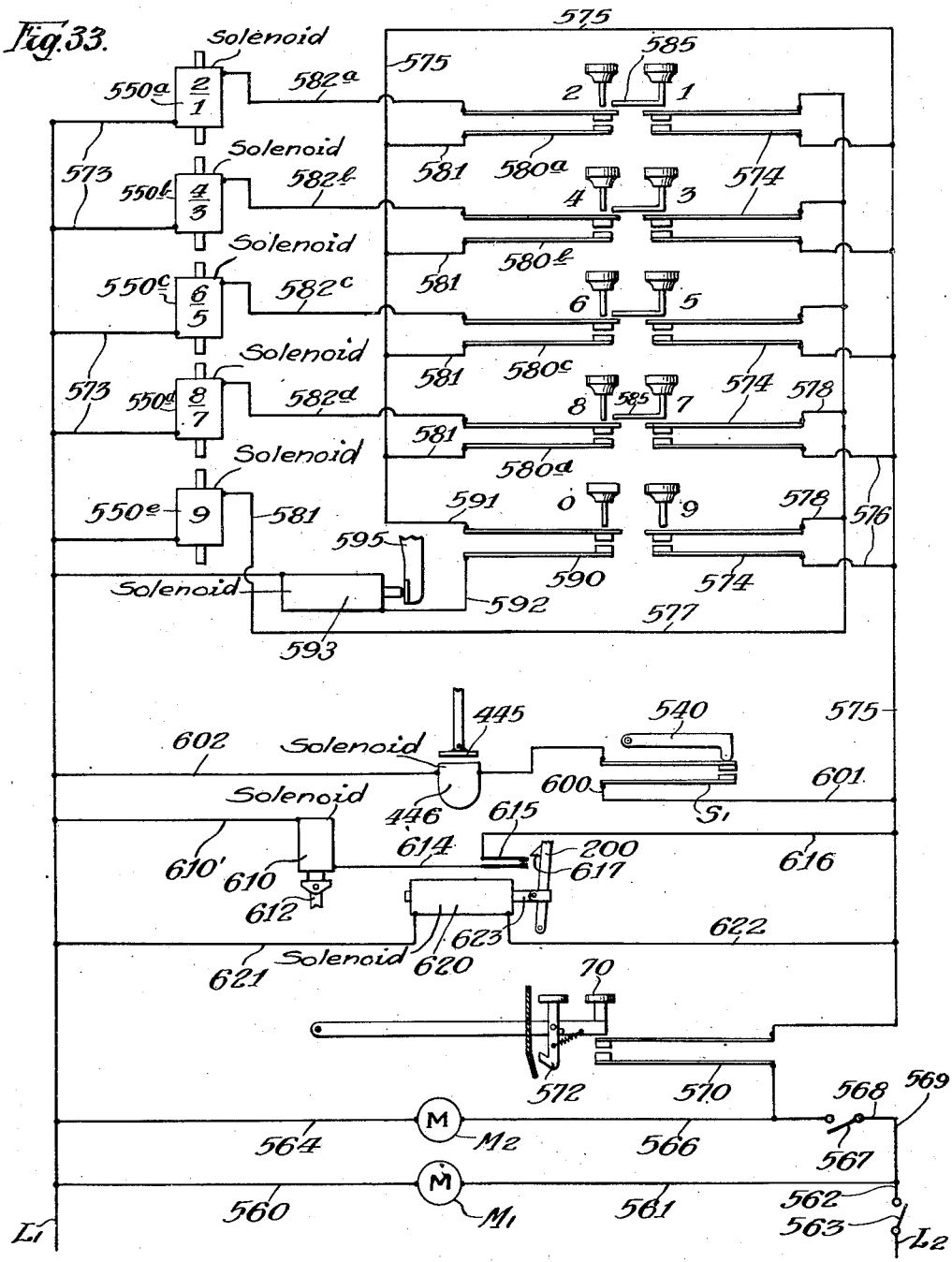

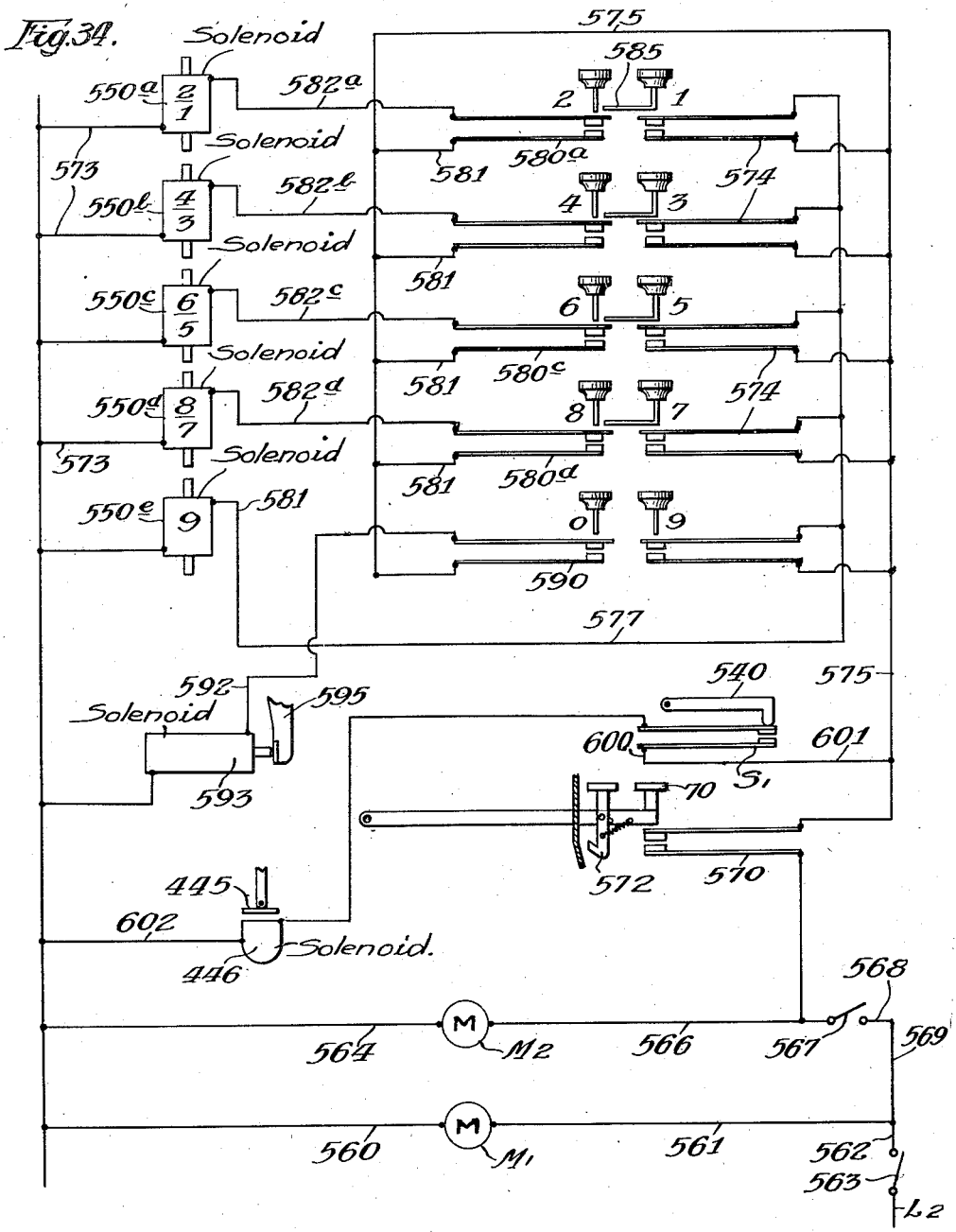

Patented Dec. 9, 1941

2,265,229

UNITED STATES PATENT OFFICE 2,265,229

MEANS FOR PREPARING PRINTING AND CONTROL DEVICES

Walter T. Gollwitzer, Euclid, Ohio, assignor to Addressograph-Multigraph Corporation, Wilmington, Del., a corporation of Delaware Application May 31, 1938, Serial No. 210,897

27 Claims. (Cl. 164—113)

This invention relates to certain novel improvements in the preparation of printing and control devices such as are disclosed in my copending application Ser. No. 65,377, filed February 24, 1936, now Patent No. 2,132,412, patented October 11, 1938.

Printing and control devices, to the preparation of which this invention pertains, embody at least two areas in one of which there are means from which impressions may be directly made onto suitable sheets and in another of which areas there are means under control of which printing, perforating or operations on the sheets or operations related to the sheets may be performed.

Sheets such as those to which reference has been made may be checks, notices of insurance companies, public utility bills or kindred business instruments or the like on which certain constantly reoccurring data are printed, such as a name and address, and on which variable data, such as numerical accounting data, are also printed. Sometimes certain of the numerical accounting data also constantly reoccur whereas other of numerical accounting data vary from time to time as different sheets or business instruments are prepared by the use of the printing and control devices.

A specific example of the use of printing and control devices such as those to which this invention pertains is the preparation of dividend checks of corporations which, as is understood, are distributed to the shareholders of the corporation from time to time as dividends are declared by the corporation. So long as dividends remain constant and the number of shares of stock in the corporation held by the various shareholders does not vary with undue frequency, it is possible to incorporate all of the data on a suitable printing device in such a way that the data may be reproduced directly. Such data include the name and address of the shareholder, the number of shares of stock owned by the particular shareholder and the amount of dividend due and payable to the shareholder, which will be the number of shares of stock times the dividend rate.

However, when for example the dividend rate varies from time to time, it is not always advantageous to incorporate the amount of dividend payable on a printing device for direct reproduction, for each variation in the dividend rate requires alteration of the amount and this entails changing the printing device or at least a portion thereof.

Heretofore it has been customary to provide means, such as type characters, from which the name and address of the shareholder of a corporation could be produced directly, on one section of a suitable printing device and sometimes, though not always, means, such as type characters, from which the number of shares of stock of the corporation owned by the shareholder could be produced directly have been incorporated on this same section of the printing device. Means, such as type characters, from which the amount of the dividend and other data which may vary from time to time could be produced directly have been incorporated on another section of the printing device inasmuch as these data were transitory, that is to say, varied from time to time. In this arrangement when the dividend rate changed it was only necessary to change the section of the printing device from which the data such as the amount payable to the shareholder could be produced directly. However, even this arrangement was subject to objection because of the fact that the section of the printing device bearing such data was usually either a metal plate, in which suitable type characters were embossed, or stencil paper, of which certain fibres were broken away or otherwise arranged to permit ink to pass therethrough so as to form type characters. In either arrangement however it was necessary to change the type characters when the dividend rate changed.

In order to avoid such changing of type characters, printing and control devices are used in place of ordinary printing devices and these printing and control devices, as stated heretofore, embody an area which is arranged to enable variable data to be printed indirectly under control of suitable control means in such area. A convenient way of accomplishing this, as disclosed in my aforesaid copending application, is to provide a card over a particular area of the frame of the printing and control device, and then control means are afforded by producing perforations in both the card and frame. In this arrangement when the data vary it is only necessary to remove the previously punched card and substitute an unpunched card therefor, after which the new card, and the frame if necessary, can be perforated to afford control representations of the new data.

In one arrangement, such as that utilized in the machine disclosed in my copending application Ser. No. 65,376, filed February 24, 1936, now Patent No. 2,132,411, patented October 11, 1938, in the case of dividend work, the data represented by perforations in such a control area on a printing and control device pertain to the amount of the dividend and it will be recognized that each time the dividend rate varies it is necessary to provide new cards on each of the printing and control devices. However, the number of shares of stock owned by the respective shareholders of the corporation does not vary to such an extent that changes entailed by reason of such variations in any way approach the magnitude of the changes entailed upon a variation of the dividend rate and for this reason it is advantageous to provide control means in the control area of a printing and control device that represent the number of shares of stock owned by the shareholder to whom the device pertains. Printing devices arranged in this manner, for example, may be utilized in a machine such as that disclosed in my copending application Ser. No. 221,841, filed July 28, 1938, wherein means are included for, in effect, multiplying the number of shares of stock owned by the dividend rate to thereby ascertain the amount due and payable to the shareholder to whom a particular device bearing representation of the number of shares of stock owned pertains.

As has been stated heretofore, it is frequently desirable to directly print the number of shares of stock owned by a shareholder on a dividend check as well as to print the amount of dividend due and payable and hence it is customary to provide on the printing and control device type characters from which the number of shares of stock, held by the shareholder to whom the particular printing device pertains, may be directly printed. In those printing and control devices where the number of shares of stock is also represented by control means in the control area of the printing and control device, it will be recognized that it is advantageous to simultaneously produce the type characters from which the number of shares of stock held by a shareholder may be directly printed and also the control means representative of the number of shares of stock in the control area of the printing and control device and, therefore, an important object of this invention is to effect such simultaneous operations.

It is to be understood that while reference is herein specifically made to the preparation of a printing and control device for use in the preparation of dividend checks of a corporation, the invention has wide application and that such description is merely for the purpose of illustration and is not to be taken as a limitation of the invention and thus, while reference has been made to the simultaneous production of type characters from which the number of shares of stock held by a shareholder may be directly printed and control means representative of such a number of shares of stock, the invention contemplates the simultaneous production of type characters and control means for whatever purpose they may be utilized.

Type characters may be produced on printing and control devices in a wide variety of machines and, for example, where stencils are employed this may be done in an ordinary typewriter, and where the printing and control devices embody metallic or other rigid members in which type characters are to be embossed such type characters may be embossed in the members in a machine such as that disclosed for example in Duncan and Hubbard Patent 1,831,103, patented November 10, 1931, but it is to be recognized that other machines may be used for this purpose within the purview of my invention.

It is however another object of this invention to associate with devices for producing type characters on printing and control devices an arrangement which will be controlled by such devices that will produce perforations or other control means in the control area of a printing and control device and another object related to the foregoing is to enable the perforations or other control means to be produced under control of the means for producing type characters on the devices.

It will be recognized that the perforations or other control means will usually pertain to numerical data and hence where the mechanism for producing type characters embodies keys or other means controlling devices for producing numerals, it is still another object of this invention to control the production of perforations or control means only from such keys or the like and an object related to the foregoing is to enable such keys or the like to be operated to merely produce type characters or to effect the simultaneous production of type characters and control means.

It will be recognized that it will not always be desirable to produce type characters along with the production of perforations or other control means and hence still another object of this invention is to enable control means to be produced independently of the production of type characters and an object related to the foregoing is to enable an arrangement for producing control means on a printing and control device to be operated either in conjunction with means for producing type characters on the devices or independently of such means.

Where control means relate to numerical data it will be recognized that such data will usually need be arranged in columnar relation, which is to say, the various digits of the numerical data will fall in different orders of numbers, as the units, tens, hundreds and so forth orders, and that sometimes digits in such orders of numbers will need be arranged to be reproduced in definite columnar relation from different devices. Hence it is desirable to enable the control means to be arranged in similar positions on different printing and control devices and hence still another object of this invention is to enable a printing and control device to be arranged in a predetermined position in an arrangement for producing control means so that as the control means are produced therein they will be arranged in certain predetermined positions on various printing and control devices.

Objects related to the last set forth object are to enable type characters and control means to be simultaneously reproduced in predetermined positions on various printing and control devices and to enable type characters and control means to be simultaneously reproduced in corresponding orders of numbers on various printing and control devices to thereby insure corresponding positioning in the proper orders of numbers of both type characters and control means on various printing and control devices.

Still further objects are to enable control means to be produced in accordance with a predetermined code whereby the area on a printing and control device devoted to the reception of control means may be of restricted size and a related object is to employ a novel code to represent the various digits.

Yet further objects are to retain the elements of printing and control devices in the mechanisms for producing type characters and control means thereon in a novel manner, and a related object is to facilitate the installation and removal of the elements of printing and control devices in the mechanisms adapted to receive such elements when type characters and/or control means are being produced thereon; to enable a mechanism for producing type characters on a printing and control device or the like to be indexed in either direction longitudinally of a line of type characters; and to so arrange a mechanism for producing type characters on a printing and control device that successive devices may be tabulated into corresponding positions with respect to the type character producing means, and an ancillary object is to enable variation of such corresponding positions.

As has been stated, control means on printing and control devices are usually represented by perforations and to this end a punching mechanism is provided for producing such perforations and among the important objects of this invention are to provide a novel mechanism for producing control perforations in printing and control devices and the like; to enable such a punching mechanism to be key-controlled; to enable such a punching mechanism to be remotely controlled; to enable indexing of a printing and control device or the like into predetermined relation with the punching means in such a punching mechanism and to visibly indicate such positioning; to insure against undesired repeat operations of the punching means; to prevent improper operation of the keys controlling the punching mechanism; to automatically effect desired indexing of the printing and control devices or the like with respect to the punching means of the punching mechanism; to enable selected punches of the punching means to be rendered operative; to positively return the punch operating arrangements to inoperative position after a punching operation; and to provide a punching mechanism of simple and economical construction and efficient and positive operation.

Other and further objects of this invention will be apparent from the following description wherein reference is made to the accompanying drawings in which Fig. 1 is a plan view of a typical arrangement of a type character and control means producing mechanism as contemplated by my invention;

Fig. 1a is a diagrammatic view of the code utilized in printing and control devices such as are prepared in the selected embodiment of my invention;

Figs. 2 and 3 are elevational views of typical printing and control devices to the preparation of which this invention pertains;

Figs. 2a and 3a are diagrammatic views illustrating methods of preparing of printing and control devices in accordance with my invention;

Fig. 4 is a fragmentary front elevation, in which certain parts are broken away, of a type character producing mechanism or embossing machine such as is utilized in the present selected embodiment of my invention;

Fig. 7 is a fragmentary side elevational view drawn to an enlarged scale and looking in at the left-hand side of the machine as shown in Fig. 4;

Fig. 7a is an enlarged detail view of a portion of the mechanism employed in the machine shown in Fig. 4;

Fig. 8 is a vertical sectional view taken on the line 8—8 of Fig. 4;

Fig. 9 is a view, drawn to an enlarged scale, of a portion of the mechanism near the left-hand side of Fig. 4;

Figs. 10 and 11 are views of portions of the mechanism shown in Fig. 9 but showing the parts in different positions;

Fig. 10a is a detail perspective view of a shouldered pin employed in the apparatus illustrated in Figs. 9 and 10;

Fig. 12 is a fragmentary plan view of the carriage illustrated in Figs. 5 and 6;

Fig. 13 is a horizontal sectional view taken in the direction of the arrows on the line 13—13 on Fig. 12;

Fig. 14 is a fragmentary detail view of a ratchet employed in the arrangement illustrated in detail in Fig. 13;

Fig. 15 is a sectional detail view taken substantially on the line 15—15 on Fig. 14;

Fig. 16 is a view showing the carriage arrangement employed in the embossing machine shown in Fig. 4;

Fig. 17 is a view partly in elevation and partly in section of a portion of the carriage arrangement shown in Fig. 16;

Fig. 18 is a sectional view taken substantially on the line 18—18 on Fig. 17;

Fig. 19 is a front elevational view, in which parts of the casing are broken away, of the punching mechanism;

Fig. 20 is a top plan view, in which the casing is broken away, of the mechanism shown in Fig. 19;

Fig. 23 is a sectional view taken substantially on the line 23—23 on Fig. 20;

Fig. 24 is a fragmentary plan detail view of the carriage employed in the punching mechanism and in which certain parts are broken away;

Fig. 25 is a fragmentary view similar to Fig. 24 but showing the parts in another position;

Fig. 26 is a side detail view of a clutch employed in the punching mechanism;

Fig. 27 is a detail view taken substantially on the line 27—27 on Fig. 26;

Fig. 33 is a wiring diagram showing the electrical circuits in and between the mechanisms shown, for example, in Figs. 4 and 19, respectively; and Fig. 34 is a wiring diagram showing a modification of the electrical circuits shown in Fig. 33.

The printing and control devices

Figure 5:
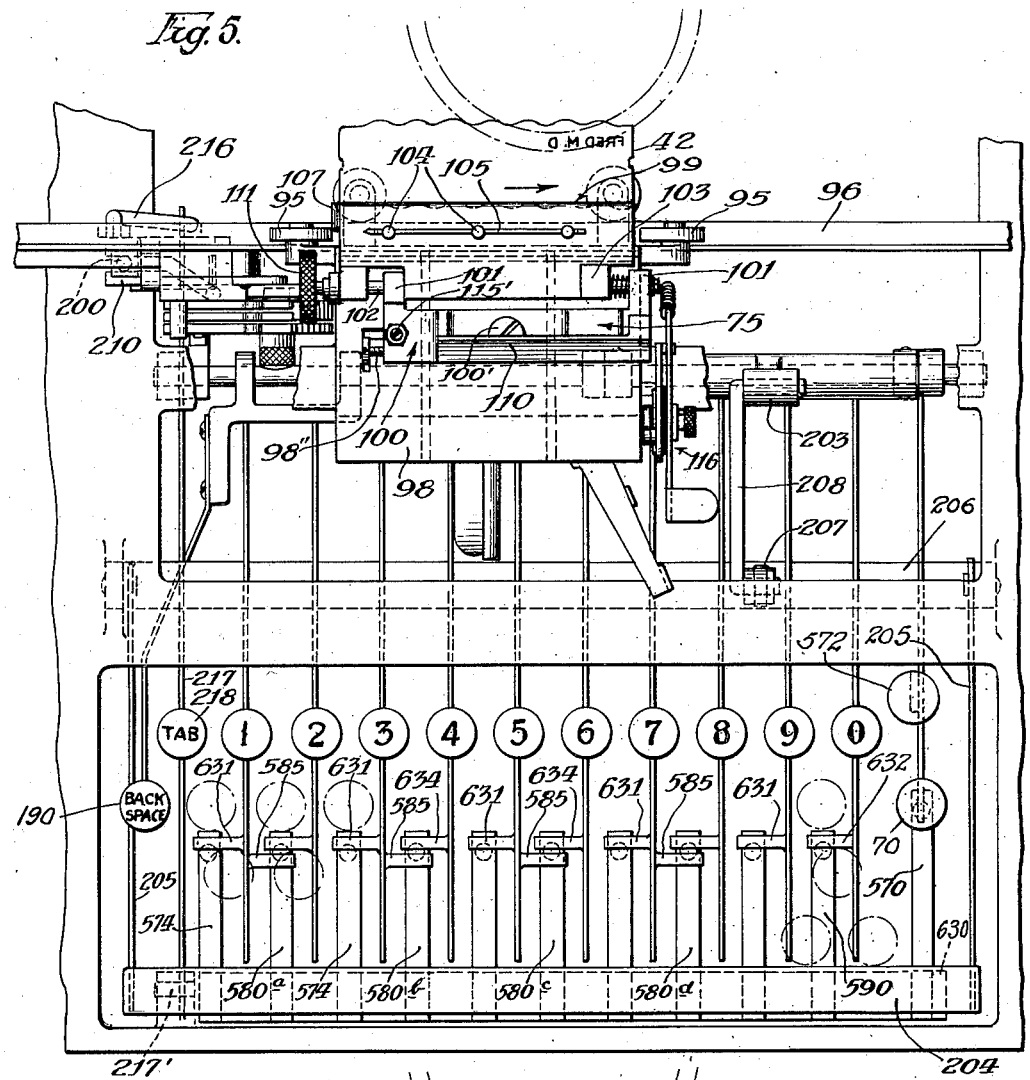
Fig. 5 is a fragmentary plan view of the keyboard and carriage of the machine illustrated in Fig. 4.
Figure 6:
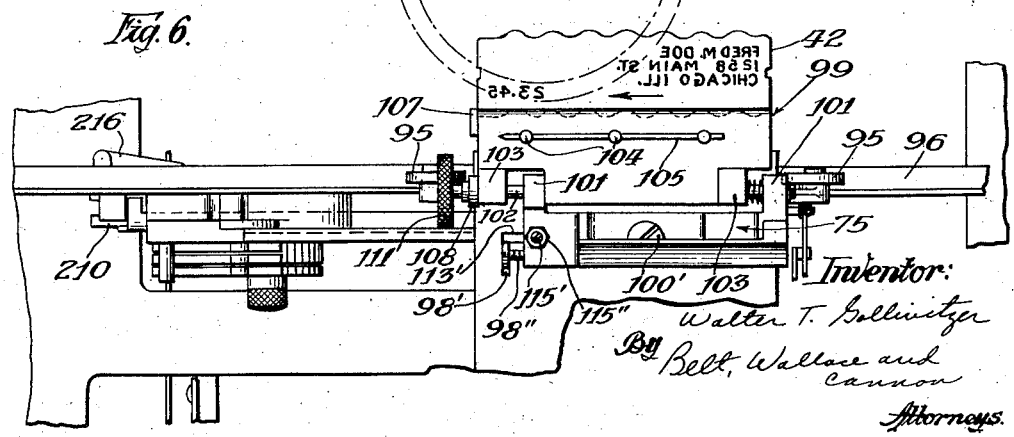
Fig. 6 is a fragmentary plan view of the carriage illustrated in Fig. 5.
Figure 21:
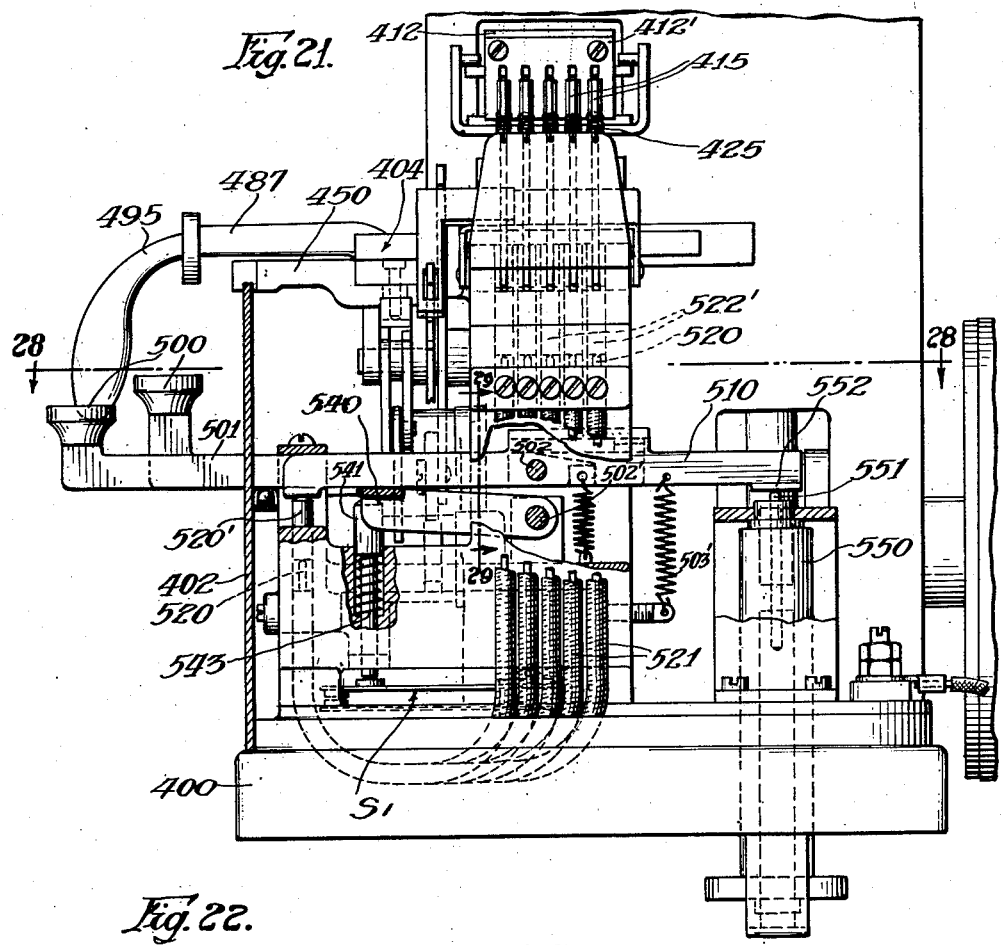
Fig. 21 is a view taken substantially on the line 21—21 on Fig. 19.

The printing and control devices that are prepared by the present invention are of the general character shown in Figs. 2 and 3 of the drawings, and are particularly described, in my co-pending patent application Serial No. 65,377, filed February 24, 1936, now Patent No. 2,132,412, patented October 11, 1938. Each such printing and control device 40 is, in a functional sense, divided into several different areas or sections, one of which is the printing means, a second, the index means, and a third, the control means. In the particular form herein disclosed, each device 40 comprises a carrier or frame 41 of sheet metal.

Means are provided on the face of the lower half of the frame 41 for removably retaining a metallic printing strip or plate 42. Such means include a bead 43 formed by reversely curling the lower edge of the frame and this bead engages the lower edge of the plate 42. A plurality of aligned retaining devices 44 are positioned on the frame to overlie the upper edge of the plate 42. Yieldable, depressible tongues 45 are formed in the frame 41 to releasably engage the end edges of the printing plate 42. The tongues 45, as herein shown, may each be provided with a boss 46 to engage notches 47 formed in the ends of the plate 42.

Along its upper edge, the frame 41 has a reversely bent flange or bead 50 which cooperates with devices 51 struck from the frame 41 to removably secure, in the present instance, separate index and control cards 52 and 53 in position on the upper half of the frame. The cards 52 and 53 may, of course, be formed in one piece, but as herein illustrated are separately formed and are spaced apart by a dividing member 54 struck from the frame 41.

The printing plate 42, prior to its mounting on the frame 41, has printing characters embossed thereon so that the printing of data such as a name, indicated at 55 in Figs. 2 and 3, an address, indicated at 56, and other supplemental information or data pertaining to the name or the like 55, such as a sum of money, indicated at 57 in Fig. 2, or the number of shares of stock owned by the person, as indicated at 58 in Fig. 3. After the plate 42 has been completed and mounted on the frame 41, the name and address 55 and 56, and if desired, other data represented by type characters on the plate, are printed from the type characters on the index card 52 which is then mounted on the frame.

As explained in my above mentioned copending application, the control area defined by the control card 53 is adapted to have formed thereon mechanical or physical representations of information or data which may serve to control the operation of different types of mechanism. Thus data may be represented in the control area or card 53 by selective positional arrangements of holes 53a therein, as for example, in accordance with the code illustrated in Fig. 1a of the drawings. Such mechanically represented data may be utilized to control a variable printer such as that shown in my copending application Ser. No. 65,376, filed February 24, 1936, now Patent No. 2,132,411, patented October 11, 1938, the punching machine shown in my copending application Ser. No. 78,682, filed May 8, 1936, now Patent No. 2,132,413, patented October 11, 1938, or as a further example, the machine shown in my copending application Ser. No. 221,841, filed July 28, 1938, as well as many other types of machines or devices.

General preparation of the devices

In preparing the printing plates 42, the name 55, address 56, and supplemental data, such as the number of shares of stock indicated at 58 in Fig. 3, are formed as by embossing, one character at a time upon a preformed blank plate 42. Such embossing may be performed in an embossing machine 60 shown in Fig. 1 and Figs. 4 to 18, the individual lines of the name, address and other matter being embossed successively on the plate, and the individual characters of each line being formed successively while the plate is advanced in a step by step movement relative to the embossing means.

As a practical matter in embossing machines of this character, the successive letters of each line of the name and address are preferably formed in the sequence in which they appear from left to right in the copy or list from which the plates are being prepared, and where the male dies of the embossing machine face upwardly, this requires step by step movement of the plate 42 from left to right as each line of the name or address or the like is embossed in the plate.

Similarly the supplemental data 57 or 58 are formed on the plate 42 by successively embossing the individual characters with a step by step shifting of the plate intermediate each embossing operation. Since such supplemental data may be printed upon accounting forms, report forms, checks and the like, the data must, usually, have a definite columnar or positional relation to the other data on the plate, and hence it is important that the operator perform a tabulating or initial positioning operation prior to embossing of the successive characters of the supplemental data upon the plate 42.

In the use of the printing and control devices 40, it is usually, although not invariably, desirable to produce in the control area, defined by control card 53, physically represented control data corresponding to the supplemental data 57 or 58 on the associated printing plate 42. When this control data is represented by selectively positioned holes 53a, such holes are formed by punching through the card 53 and the underlying metal of the frame 41, the several representations of the individual characters of the control data being punched successively during step by step movement of the frame 41 relative to the punching means. The particular positional or columnar relation of the several characters of the control data on the control area is, of course, predetermined by the construction and relation of the means provided to sense the area in machines in which the devices are used. In any event it is usually desirable that the control data be located in a predetermined tabular relation on the control area 53 and that the same sequence or, alternately, a reversed sequence of characters be maintained in the control area as is resorted to on the plate 42.

As a matter of convenience in checking or verifying the printing and control devices 40 after assembly of the component parts thereof, I prefer to arrange the control data so that the worker, while holding the printing and control device 40 in position to read the index card 52, may read or verify successive characters of the control data from left to right in the same sequence as they would appear in a written or printed representation of such control data.

In accordance with the present invention means are provided whereby an operator may appropriately represent or record the desired data on the printing section and on the control section of the control devices in a relatively simple series of operations, the representations of each individual character of the supplemental data as 58 preferably being produced simultaneously on the printing plate 42 and the control area 53. To this end, the present invention provides in association with the embossing machine 60 a control data forming means such as a punch 61 whereby the control data may be punched in the control area 53 of the frame 41 under the control of the embossing machine and at the same time as the embossed representation of such data is formed on the printing plate 42.

As hereinbefore pointed out, it is desirable to position the characters of the supplemental data on the control area 53 of the frame in such a relation that these characters may be read or verified in their normal left to right sequence when the frame is held in position to read the index data on the index card 52. Such positioning of the supplemental data being desirable, the last or right hand character of such data should be located in the columnar position adjacent to the right hand edge of the area 53 in order that the printing, calculating or other machine with which a device is subsequently used may be properly controlled. Thus, when the control data is to be recorded simultaneously on the plate 42 and a control area 53, the initial locations or tabular positions as well as the step by step movements of the frame 41 and the printing plate 42 be coordinated so as to properly locate the several characters of the supplemental data thereon. To attain this end, I have diagrammatically shown, in Figs. 2a and 3a, two methods which may be employed.

Method A

In Method A, illustrated in Fig. 2a, the movement of the printing plate 42 during the embossing of the supplemental data thereon is in the same direction as when the name and address is being embossed, as indicated by the two arrows beneath the plate 42. Thus the highest order, or left hand character, as viewed in Fig. 2a, of the supplemental data is first formed on the plate 42 and the frame 41, so that prior to the formation or entry of such data both the frame 41 and the plate 42 must be so tabulated, that is, positioned, as to insure the proper location of the last character or digit of such data on both the frame and the plate. Such tabulating operations must, of course, be accurately performed, and different positioning may be required for each printing and control device. As a result some users may desire a simplified mode of operation such as that illustrated as Method B in Fig. 3a of the drawings.

Method B

According to Method B, the right hand as viewed in Fig. 3a, or last character of the supplemental data as 58 is first formed, and the succeeding characters from right to left in such data are formed in succession. Further, the left hand or last representation of the control means as 53a, as viewed in Fig. 3a, is first formed, and the succeeding representations from left to right are formed in succession. Thus, in the formation of the supplemental data and the control means on the elements of a printing and control device 40, both the plate 42 and the frame 41 are initially located in the same positions regardless of difference in the number of characters in the supplemental data and control means. The employment of Method B, however, requires that during the formation of the supplemental data the printing plate 42 be given a step by step movement in the direction opposite to its movements during the formation of the name and address data, as indicated by the two arrows beneath the plate 42 in Fig. 3a. Thus, the printing plate 42 is, in effect, backspaced during the formation of the supplemental data thereon.

General arrangement

To the end that the printing characters on the plates 42 and the control representations on frames 41 may be formed expeditiously and accurately, the embossing machine 60 and the punch 61 are positioned in close association as shown in Fig. 1, whereby, from a working position before the embossing machine, an operator may conveniently insert and remove the plates and the frames, and may conveniently perform the various tabulating and positioning operations required. In addition, there is provided an operative connection between the embossing machine 60 and the punch 61 whereby the formation of any selected numeral by the embossing machine may, in the formation of the supplemental data, serve to cause a corresponding numerical representation to be entered in the control area 53 of the frame which is in the punch 61.

In the form herein illustrated the embossing machine 60 is of the keyboard controlled type in which the selection of the desired characters from revolving die-heads 65 and 66 is controlled by a standard keyboard 67 located at the front of the machine frame 68. The keyboard 67 has the usual group of letter keys 67a, as well as numeral keys 67b; and through a connecting means 69 the numeral keys 67b may be operatively associated with the punch to make corresponding entries. The connecting means 69 in the present machine is normally inoperative, but may be rendered operative by depression of a control or conditioning key 70 located at the right edge of the keyboard 67.

As above pointed out, the punch 61 may be operated under the control of the keys 67b of the embossing machine but in order that the punch may be operated independently of the operation of this machine, a keyboard 71 is also provided on the punch 61.

The embossing means

The embossing machine 60 employed in the present invention is illustrated in Figs. 1, and 4 to 18, and is so arranged that the die-heads 65 and 66 may be rotated on a vertical axis to bring any selected pair of complemental dies 65a and 66a (Fig. 7) into operative relation with a blank plate 42 carried along the forward side of the machine frame by a carriage 75. The die heads 65 and 66, as herein shown, are fixed in vertically spaced relation on a rotatable vertical shaft 76 (Figs. 1 and 4) journaled at its lower end in the frame 68 and at its upper end in an upstanding arch-like frame element 77. The pairs of complemental dies 65a and 66a are mounted in opposed vertically shiftable relation about the periphery of the die heads 65 and 66 so that any pair, selected and shifted by rotation of the die heads to an embossing position at the forward side of the machine, may be brought together to emboss the selected character on the plate 42 positioned between the selected pair of dies as shown in Figs. 4, 5 and 7.

Actuation of the selected pair of dies 65a and 66a is preferably effected by means which drive the two dies toward each other so as to engage the plate 42 and form the desired character therein without vertically shifting the plate from the full line position of Fig. 7. In the form illustrated this means, for the upper die 65a, comprises an upper rocker arm 78 (Fig. 4) pivoted at 79 on the frame element 77 and operated by a toggle 80, acting between said arm 78 and an actuating shaft 81 mounted adjacent to the top of the frame element 77.

The lower die 66a is actuated by a lower rocker arm 85 which has one end pivoted at 85' to the frame 77, while a pitman 86 operated by a crank 87 on a horizontal operating shaft 88 is connected to its other end. A lower die stock 89 (Fig. 7) is mounted for sliding movement in the frame between the lower rocker arm 85 and the lower die 66a is located in embossing position. A similar upper die stock 91 (Fig. 7) is provided between the upper rocker arm 78 and the upper die 65a, the die stock 91 being supported for vertical movement on a carrier arm 92 pivoted at 79.

When the shaft 88 is rotating, the two rocker arms 78 and 85 are constantly actuated in unison by the pitman 86 and an operating connection between said shaft 88 and the toggle shaft 81, such operating connection being located at the back of the machine and being shown in detail in the patent to Joseph S. Duncan and Henry E. Hubbard, No. 1,831,103.

As described in the patent to Joseph S. Duncan, No. 1,518,904, the rocking movement of the arms 78 and 85 is normally ineffective to actuate the dies 65a and 66a. To this end shiftable die shuttles 91a and 92a are mounted for movement into the path of the arms 78 and 85 only when an embossing operation is desired. Thus as shown in Fig. 4, the shuttles 91a and 92a are connected by links to opposite ends of a lever 93, which is rocked by means of a bell crank lever 94. The bell crank lever 94 is associated with the die selecting mechanism in the manner disclosed in said Patent No. 1,518,904 so as to render said rocker arms 78 and 85 operable only after selection and proper positioning of a pair of dies.

The selection of the desired pair of dies 65a and 66a is, in the present embodiment, effected by the keys 67a and 67b, the die carrying shaft 76 being normally rotated at a high rate of speed and being stopped in any selected position by stop or abutment means operated by said keys. The mechanism for effecting such selective positioning of the die heads forms no part of the present invention, and therefore it will suffice to point out that its specific structure is described in the aforementioned Duncan et al. patent, No. 1,831,103.

It may be stated, however, that as disclosed in said patent, the die actuating rocker arms 78 and 85 are rendered effective automatically by said shuttles during one rocking cycle of said arms immediately after and as an incident to the stopping of the die heads in any selected position.

The carriage 75, upon which the plate 42 is supported during the performance of the embossing operations, is so constructed and related to the die actuating mechanism as to effect automatic step-by-step or character spacing movement, and for manually effected line spacing of the plate 42. To this end the carriage 75 has its main body portion mounted by means of a plurality of guide rollers 95 (Figs. 5, 6 and 7) on a transverse rail or track 96 which extends across the front of the frame 77. The rollers 95 are so related to the track 96 as to permit movement of the carriage across the front of the machine, thus permitting character spacing movement of the carriage, while on the top of the carriage across slide 98 is provided for movement transversely with respect to the track 96, or toward and away from the die heads. Thus the cross slide 98 provides for line spacing movement, the plate 42 being supported on the cross slide 98 by releasable clamping means such as the clamping jaws 99 (Figs. 7, 7a, 16 and 18).

As shown herein the jaws 99 are carried on a mounting member 100 which is detachably secured on the cross-slide 98, the member 100 having upstanding bearing lugs 101 thereon in which a jaw-supporting shaft 102 is journaled. The two jaws 99' and 99" are in the nature of opposed plates, the lower one 99' of which carries lugs 103 through which the shaft 102 rotatably extends, and the upper jaw 99" has a pivotal connection with the lower jaw 99' by means of pins 104 extending loosely through the two plates 99' and 99". These pins 104 have securing wires 105 extending therethrough on the outer sides of the two plates, and the pins 104 and the plates are so fitted as to permit slight pivotal movement for clamping and unclamping of a plate 42.

To provide for clamping of the jaws, the plates 99' and 99" extend at their rear ends so as to embrace opposite sides of the shaft 102, and the shaft is flattened on opposite sides as shown in Fig. 18. Thus when the shaft 102 is rotated in one direction nearly 90° relative to the plates 99' and 99", the adjacent rear edges of the plates are separated so as to clamp the forward or outer edges of the plates or jaws upon the printing plate 42. It will be seen in Fig. 18, that a spring 106 is provided adjacent the central pin 104 and between the plates 99' and 99" to separate said plates or jaws to the maximum extent. For convenience in positioning the printing plates 42 between the jaws, the lower jaw 99' has a shoulder to limit the inward insertion of the plate, and a shoulder 107 (Fig. 6) at the left end thereof to engage the left end of the plate 42 and thereby assure proper endwise positioning of the printing plate.

In the operation of the jaws 99 to clamp a plate 42, the jaws are rocked toward the operator to the dotted position of Fig. 7, wherein they rest against a loading abutment 110 formed on the member 100. Such movement of the jaws is effected by the shaft 102 which has a 90° rotative lost motion connection with the lower jaw 99' sufficient to permit the shaft to accomplish its jaw-clamping function, in addition to its function in moving the jaws between loading and embossing positions. The desired lost motion is attained through a notched collar 108 fixed on the shaft 102 and arranged to engage a projecting pin 109 on the jaw 99' as shown in Fig. 7a. To facilitate the operation of the jaws 99, the shaft 102 has a knurled operating disk 111 on its projecting left end. When the jaws 99 are shifted to their upright or loading position, the shaft 102 is turned to the full extent permitted by its lost-motion connection of Fig. 7a, so as to fully release or unclamp the jaws. The printing plate 42 is then inserted between the jaws 99 which retain the plate sufficiently to permit the jaws to be rotated back to their horizontal position of Figs. 7 and 18. This movement of the jaws is limited by an abutment pin 112 on the cross slide, and to securely clamp the printing plate, the operator continues the turning of the shaft 102 to the full extent permitted by its lost motion connection.

It will be understood that such rocking movement of the jaws 99 to and from the loading position takes place in the normal use of the machine while the carriage is located at one side of the embossing position.

As herein shown the mounting member 100 is secured on the cross slide 98 by means which provides for adjustment of the mounting member parallel to the path of the carriage, and also which provides for adjustment of the mounting member so that the plate 42 carried thereby is positioned with its axis parallel to said path of the carriage 75. To this end the top face of the cross slide has alined slots 113 and 113' formed therein generally parallel to the carriage path, and a fixed depending pin 114 projects from the mounting member 100 into the slot 113, (Fig. 12). For cooperation with the other slot 113' a pin 114' is provided which is fixed eccentrically on a small disk 115 mounted in the bottom of the member 100. By means of a stub shaft 115' projecting upwardly through the member 100, the eccentric pin 114' may be shifted so as to adjust the mounting member into the desired parallel relation to the carriage path, and by a lock nut 115" (Fig. 6) threaded onto the stub shaft 115', this adjustment may be maintained.

A headed screw 100' extends through an aperture 100" in the member 100 and is threaded into the cross slide to secure the mounting member 100 onto the cross slide 98 and, as shown in Fig. 18, the aperture 100" is somewhat larger than the screw 100" so as to permit the desired horizontal adjustment of the member 100.

A transverse slot 98' is provided in the cross slide 98 to effect longitudinal adjustment of the mounting member 100, and a headed screw 98", projecting from the left end of the member 100, has the lower edge of its head positioned in the slot 98'. Thus by adjustment of the screw 98" the longitudinal positioning of the mounting member is determined.

For the purpose of imparting the desired line spacing movement to the printing plates, the cross slide 98 is normally urged to a retracted position by springs 75' (Fig. 18) and is advanced line by line by means of a ratchet mechanism 116. In the form shown, the cross slide is supported and guided on the carriage by a plurality of rods 117 which are secured to the carriage and slidably engage bearing apertures 118 in depending flanges 119 along the front and rear of the cross slide.

A rotatable shaft 120 is mounted transversely of the carriage 75 to impart the desired advancing movement to the cross slide and pinions 121 are fixed on the shaft and mesh with racks 122 formed on depending flanges at opposite ends of the cross slide. The shaft 120 carries a ratchet wheel 125 at its right hand end and the ratchet is fixed in a rotatively adjustable relation to the shaft through the medium of a nonrotatable collar 126 and two adjusting screws 127, as shown in Figs. 14 and 15 of the drawings. An actuating pawl 130 and a control pawl 131 are associated with the ratchet wheel 125 to actuate the shaft 120. As shown in Figs. 12, 13 and 16, the actuating pawl 130 is of an inverted U-form and is pivoted intermediate its ends, at 132, on one end of a carrier arm 133. The pawl 130 has a tooth 134 at one end thereof and this tooth is urged into operative engagement with the teeth of the ratchet wheel 125 by a spring 135 acting between the pawl 130 and its carrier arm 133. The carrier arm 133 is mounted radially on the shaft 120 for rotative movement relative to said shaft, so that by rocking said arm from the position of Fig. 13 in a counter-clockwise direction the cross slide 98 may be advanced. The carrier arm 133 is normally urged by a spring 134 to its position of Fig. 13.

A bell crank 135 (Fig. 12) is pivoted on the carriage 75 for actuating arm 135' thereof engages the downwardly extending end of the carrier arm 133, the bell crank 135 being operated by a second bell crank 136 which is pivoted on the same axis as bell crank 135. One arm of the bell crank 136 extends outwardly from the carriage 75 and constitutes a line space lever 136' (Fig. 12) while the other arm has a return spring 137 connected thereto and has a stop shoulder 138 formed thereon to determine the initial position of the line space lever 136'. An operating connection between the line space lever 136' and the transmitting bell crank 136 is provided by a downturned lug 138 on the bell crank lever 136' which engages the bell crank 135 to transmit operating movement of the actuating pawl 130. The extent of movement of the lever 136' is limited by abutment faces 140 (Fig. 12) so that a full stroke of said lever advances the cross slide one line-space. Having been given such a line spacing movement the cross slide is retained in its advanced position by the control pawl 131, which is pivoted on the carriage beneath the shaft 120 on a pivot pin 141, (Fig. 13) and has a tooth 142 operable to engage the ratchet wheel 125. The tooth 142 and the teeth of the ratchet wheel are so related that the yielding force tending to produce return movement of the ratchet wheel acts to hold the two teeth in their operative relation and thereby fixes the cross slide in the desired position. As shown in Figs. 12 and 13, the control pawl 131 has a finger piece 144 by which it may be depressed to disengage the pawl 131 from the ratchet wheel; and to simultaneously release the actuating pawl 130, the pawl 131 has a tail piece 145 which, in the disengaging movement of pawl 131, engages a roller 146 on the pawl 130 to shift said pawl 130 out of engagement. A spring 147 acts between the tail piece 145 and the carriage 75 to maintain the control pawl 131 in operative engagement with the ratchet wheel.

The requisite step by step character-spacing movement of the carriage 75 is effected by means provided to control a spring biased tendency of the carriage 75 to shift toward the right, as viewed in Fig. 4. Such a spring bias may be imparted to the carriage by a conventional tensioning drum TD (Figs. 1 and 4) mounted on the extending right end of the rail 96 and operatively connected to the carriage 75 by a flexible band 150 as shown in Fig. 16.

The means herein provided for controlling the spring biased right hand movement of the carriage 75 is preferably such as to simplify and cooperate in part in attaining a tabulating control of the carriage as well as in the provision of a back spacing mechanism. To this end there is provided a carriage control shaft 155 rotatably mounted on a horizontal axis, as shown in Fig. 8, in a bearing member 156 carried on the guide rail 96 adjacent the left hand side of the machine frame. On its rear end the shaft 155 has a pinion 155' (Fig. 8) which on its upper side engages a horizontal rack 157 which is guided in the mounting or bearing member 156 and has its right hand end releasably engaged with the carriage 75 by means of a latch member 158 as shown in Figs. 9 and 16. Thus, the spring tension on the carriage 75 tends, through the rack 157, to rotate the control shaft 155 in a clockwise direction (Figs. 9 to 11 and 16), and means is therefore provided for governing such rotation of the control shaft 155 to attain the desired tabulating and character spacing movements or for producing reverse or back spacing movement thereof.

The control shaft 155, forwardly of the bearing member 156, has a relatively widetoothed ratchet wheel 160 keyed thereto as shown in Fig. 8, and outwardly of the ratchet wheel a notched tabulating disk 161 is fixed on the shaft 155. Two similar escapement pawls 162 and 163 (Fig. 8) are provided for cooperation with the ratchet wheel 160 while a tabulating pawl 164 is provided for cooperation with the tabulating disk, this tabulating pawl 164 being arranged for engagement with a tabulating stop 165 which may be manually positioned in any selected one of a plurality of radial slots 166 formed in the disk 161 (Fig. 9).

The two escapement pawls 162 and 163 and the tabulating pawl 164 are generally similar in form, as shown in Figs. 9 to 11, and are provided on corresponding arms of similar bell cranks. These bell cranks are mounted on a common shaft 167 projecting from the mounting member 156, so that the arms upon which the pawls are provided project over the control shaft 155, while the other arms of the bell cranks project downwardly from the pivot shaft 167.

In accordance with the present invention the three pawls 162, 163 and 164 are normally urged toward effective positions by similar springs 169 and are governed by a single actuating member 170 which acts on the depending arms of the bell cranks upon which these pawls are provided. In the present embodiment the common control or actuating member 170 takes the form of a rock shaft which is mounted in the bearing member 156 to the left of the depending bell crank arms, and is provided with cam surfaces arranged to act on these adjacent bell crank arms to effect character spacing movement of the escapement pawls 162 and 163 in certain movements of the rock shaft 170, and to effect release of the pawls 162 and 163 with a simultaneous operation of the tabulating pawl 164 in other movements of the rock shaft.

Thus, as shown in Figs. 9, 10 and 10a, the rock shaft 170 has two flat cam surfaces 171 and 172 formed thereon for operation on the depending bell crank arms. These surfaces 171 and 172 are in the present instance formed by cutting away one half of the shaft 170, as shown in Fig. 10a, so that each surface lies in a different diametric plane of the shaft, the two diametric planes in the present case being angularly displaced about 60° from each other.

In Figs. 9 and 16 of the drawings the rock shaft 170 is shown in its normal position, and the depending bell crank arm from the pawl 162 forms a tail piece 162' resting against the lower corner 171' of the cam surface 171, and when thus positioned the pawl 162 is engaged with the ratchet wheel 160. Similarly the pawl 163 has its depending bell crank arm formed to provide a tail piece 163' which in the normal position of the rock shaft 170 rests against the upper corner 172' of the surface 172, and is so related to the pawl 163 that this pawl is then out of engagement with the ratchet wheel 160 as shown in Fig. 9. As will be noted in said views, the tail piece 163' is so formed that it projects downwardly in spaced relation to the surface 172 so that in a relatively slight counter clockwise rocking movement of the shaft 170, the upper corner 172' controls the movement of the pawl 163 so as to permit the same to move into engagement with the ratchet, the pawl 163 having its operative face slightly set off to the left of the corresponding face of the pawl 162 so as to engage the succeeding tooth of the wheel 160 when the pawl 162 is released.

Thus, a rocking movement of the shaft 170 from the normal position of Fig. 16 in a counter-clockwise direction to a position wherein the opposing face of the tail piece 163' is substantially parallel to the surface 172, constitutes a character spacing movement of said shaft 170, and causes the lower corner 171' to act on the tail piece 162' and thereby release the pawl 162 while simultaneously the upper edge 172' moves away from the tail piece 163' and allows the pawl 163 to move into the path of the succeeding tooth of the ratchet. When the shaft 170 is allowed to return to the position of Fig. 16, the pawl 162 engages said succeeding tooth and the pawl 163 is withdrawn so as to be conditioned for the next operation.

During such a character spacing operation the tabulating pawl 164 is maintained at all times out of the path of the tabulating stop 165, for as shown in Figs. 9 and 16, the pawl 164 has a tail piece 164' which rides on the upper corner 172' and which is so related to its pawl 164 that in this normal shaft positioning the pawl 164 is spaced from the path of the tabulating a substantial distance. This distance is such that in a character spacing movement of the rock shaft 170 the pawl 164 merely approaches but does not reach the path of the stop 165.

As shown in Figs. 9 and 16, the tail piece 164' of the tabulating pawl 164 is relatively short, it being terminated short of the central axis of the rock shaft 170, while the tail piece 163' extends downwardly to the lower edge of the shaft 170. Thus, if the shaft 170 is rocked in excess of its above described character spacing movement, the lower edge 172'' of the surface 172 engages the tail piece 163' so as to withdraw the pawl 163, while the tabulating pawl 164 by its continuing contact with the upper edge 172' is allowed to move to its effective position of Fig. 11. It will be understood, of course, that during such tabulating operation, the pawl 162 is maintained out of operation by the continued advancing movement of the lower cam edge 171'. Upon return of the rock shaft to its initial position the pawl 163 is first reengaged with the ratchet wheel prior to withdrawal of the tabulating pawl 164, after which the pawl 162 takes precedence over the pawl 163 in the same manner as in a character spacing operation.

To provide for back-spacing of the carriage 75, a back spacing pawl 180 is mounted for vertical movement along the right hand side of the ratchet wheel 160, the pawl 180 being formed on the upper end of a back spacer link 181 which rides between a guide block 182 and a backing pin 183 both carried by the mounting member 156. A spring 184 is mounted on the link 181 so as to act against the backing pin 183 and in upward movement of the link urges the pawl 180 into engagement with the ratchet wheel 160 whereby in continued upward movement a back spacing of the control shaft 155 is effected. The return or downward movement of the link 181 is limited by a stop pin 185 on the member 156, which stop pin cooperates with a sloping bottom surface 186 on the pawl to insure withdrawal of the pawl 180 from the teeth of the ratchet wheel.

As shown in Figs. 4, 5, 7 and 9, the back spacing pawl 180 may be operated manually by means of a back space key 190 mounted at the left side of the keyboard 67 on a supporting lever 191 which is pivoted on a shaft 192 (Figs. 5 and 7). A rigidly connected arm, to which the lower end of the back spacer link 181 is pivoted at 193, projects rearwardly from the lever 191 over the shaft 192. Thus by depression of the back space key 190, the control shaft 155 may be reversely actuated so as to shift the carriage one space to the left.

For the purpose of actuating the rock shaft 170 selectively through its tabulating or character spacing movements, separately formed arms 195 and 196 are fixed on the rock shaft 170 adjacent to the rear end thereof, as shown in Figs. 5, 7 and 11. The lever 196 is of bell crank form to provide upwardly extending arm 196' (Fig. 9); and by means of a spring 197 acting between the arm 196' and the bearing member 156, the rock shaft 170 is urged toward its normal position shown in Fig. 9. The normal position of the rock shaft is determined by a stationary stop pin 196" lying in the path of the arm 196'.

As shown in Figs. 7, 9 and 11, the member 196 has a forwardly turned lug 198 at its end which may be engaged by a shoulder 199 (Fig. 11) formed near the upper end of a downwardly shiftable spacing rod 200 to actuate the rock shaft 170 through a character-spacing movement. The spacing rod 200, which is best shown in Figs. 4, 5, 7 and 9, has its lower end pivoted on one arm 201 (Fig. 7) of a bell crank 202 mounted on the shaft 192, the arm 201 projecting rearwardly in a generally horizontal direction from the shaft 192, while the other arm 203 of the bell crank 202 extends upwardly from said shaft, near the right-hand side of the machine as shown in Fig. 5. A spacing bar 204 is provided along the front of the keyboard 67, this bar being mounted on the forward ends of supporting arms 205 which project forwardly from a mounting sleeve 205' carried on a cross shaft 206. From the mounting sleeve 205', a rigidly formed arm 207 projects downwardly as shown in Figs. 5 and 7, and is operatively connected to the bell crank arm 203 by a link 208. A spring 209 acting on one of the arms 205 normally maintains the spacer bar 204 in its elevated position; and when the bar is depressed, a downward movement is imparted to the spacer rod 200. In such downward movement, the upper end of the spacer rod 200 is guided laterally by spaced guide fingers 210 (Figs. 5 and 9) formed on a rocker element 211 pivoted on the member 156; while the rod is urged toward the lug 198 of the actuating arm 196 by a spring 212 acting upwardly and laterally between the rod 200 and the tail 213 of the rocker element 211, whereby normally to insure operative engagement of the shoulder 199 with the lug 198.

After the desired character spacing movement of the arm 196 has been completed, a lower shoulder 199' on the character spacing rod 200 strikes the guide fingers 210 so as to shift the rocker member 211 in a counter-clockwise direction (Fig. 9), thus causing a rearwardly bent lug 211' on an upper part of the member 211 to engage the upper portion of the rod 200 and disengage its shoulder 199 from the lug 198 of the arm 196. Thus the actuating rock shaft 170 has a quick return movement to its normal position, whereby to be conditioned for other operations.

Character spacing is effected automatically near the end of each embossing operation by suitable means such as that shown and described in Patent No. 1,831,103, patented November 10, 1931.

As shown in Figs. 10 and 11, the tabulating arm 195 has an arcuate, generally vertical, slot 215 formed therein through which the laterally bent upper end or head 216' of a tabulating rod 216 extends. This rod 216 is pivoted at its lower end to the rear end of a lever 217, which lever is pivoted at its other end 217' adjacent to the front edge of the machine frame. An upstanding tabulating key 218 is provided on the lever 217 adjacent the keys 67b, the lever and the key 218 being normally elevated by a spring 219 so that the head 216' of the tabulating rod 216 normally stands in the position shown in Fig. 11, that is, at the lower end of the slot 215. Thus the cam shaft 170 may be rocked through a character spacing movement without disturbing the tabulating mechanism, as will be evident from Fig. 10.

When the tabulating key 218 is depressed, the head 216' of the rod is drawn downwardly to the position shown in Fig. 11 so as to move the arm 195 downwardly beyond the position of Fig. 10, whereby to cause a tabulating operation of the pawls 192, 193 and 194.

In order that the operator may manually shift the carriage 75 back and forth, as for the loading and unloading operations, means is provided whereby the carriage may be released from the controlling action of the character spacing escapement. This means preferably includes a manually operable release means located on the carriage 75, and as shown herein, comprises a bell crank lever 220 mounted on a shaft 221 (Figs. 16, 17 and 18) within the carriage 75 and having one arm 222 thereof projecting forwardly through an opening 223 in the forward side of the carriage. The arm 222 constitutes a carriage release lever and is positioned directly over a fixed gripping piece 224 so that an operator may conveniently depress the release lever 222. A spring 225 urges the release lever 222 to an elevated position and as shown in Fig. 18, means is provided in association with the rearwardly projecting arm 226 of the bell crank 220 to release the pawl 162 from the ratchet wheel 160 when the release lever 222 is depressed.

This last mentioned means is preferably operable in any position of the rack and the carriage, and as herein shown comprises a horizontally positioned angle bar 230 (Figs. 8, 11, 16, 17 and 18) mounted on the rail 96 for transverse or vertical shifting movement by the arm 226, and arranged, when elevated from its position of Figs. 8 and 16, to release the escapement pawl 162 and thereby permit free traversing movement of the carriage. To this end the angle bar 230 has a forwardly facing channel portion 231 at its left end (Figs. 8 and 16) into which a roller 232 on the rear face of the pawl 162 projects, and the bar is suspended on parallel links 233 from the rail 96. Thus the bar 230 is maintained in a horizontal position at all times; and the bar is of such a length that the carriage 75 may be shifted a substantial distance to the right from its operative position while still maintaining a roller 234 on the arm 226 beneath the forwardly projecting flange of the bar 230. Hence, when the carriage is located at any point within this range, the release lever 222 may be depressed and the carriage traversed freely back and forth, and upon return of the lever 222 to its normal position the escapement pawl 162 again becomes effective to hold the carriage in its new position.

As shown in Fig. 16, the rack 157 is releasably connected to the carriage 75 by means of the latch member 158, which latch has a notch 240 that is normally maintained in engagement with a tooth 241 on the carriage 75 by means of a spring 242 acting between the latch 158 and the rack. In some instances it is desirable to move the carriage 75 to the right beyond the range of movement of the rack 157 for the purpose of smoothing the embossed letters by means of a plate roller attachment (not shown). When such rolling of the plate 42 is desired the carriage is moved to the right until a beveled surface 243 on the latch member 158 strikes a pin 244 on the rail 96, so that the latch is disengaged from the tooth 241. The rack then remains in substantially the position of Fig. 16 while the carriage 75 is shifted further to the right. In the return movement of the carriage the tooth 241 engages the left side of the notch 240 so as to shift the rack to the left and to cause re-engagement of the latch 158 with the tooth 241.

The punching means

The punching means 61 is herein presented in two generally similar embodiments, the first of which is adopted for performance of its punching operations in accordance with method B, while the second form is adapted for use in accordance with method A; the two embodiments differing principally in the direction of the step by step advancing movement of the frames 41 during the production of the control data thereon.

The punching device 61 is best illustrated in Figs. 19 to 29 of the drawings, and comprises a base 400 suitably supported in a conveniently accessible position as by means of a bracket 401 (Fig. 1) on the side of the embossing machine 60, the base 400 serving to support the various operative elements of the punching device, and these operative elements being enclosed to a large extent by a housing 402. In the front of the housing 402, adjacent to the embossing machine 60, an opening 403 is provided through which the operator may insert a control frame 41 into an operative position on a shiftable carriage 404 located within the housing. When so mounted on the carriage 404, the frame 41 may be shifted in a longitudinal direction into any desired relationship with a row of selectively operable punches 405 whereby the desired control data may be formed in properly positioned relationship on the control area 53 of the control device 41.

The punching device 61 has five punches 405, designated as 405a to 405e in Fig. 20 for use in punching the data representations under the code, shown in Fig. 1a. The five punches 405, as shown in Figs. 19 to 23, are mounted for vertical movement in a guide member 406 which is carried by an over-hanging head 407 projecting from the rear of the base 400 forwardly over the carriage 404. On the base 400, beneath the punches 405, a replaceable complemental punching die 408 is provided for cooperation with the punches.

Figure 22:
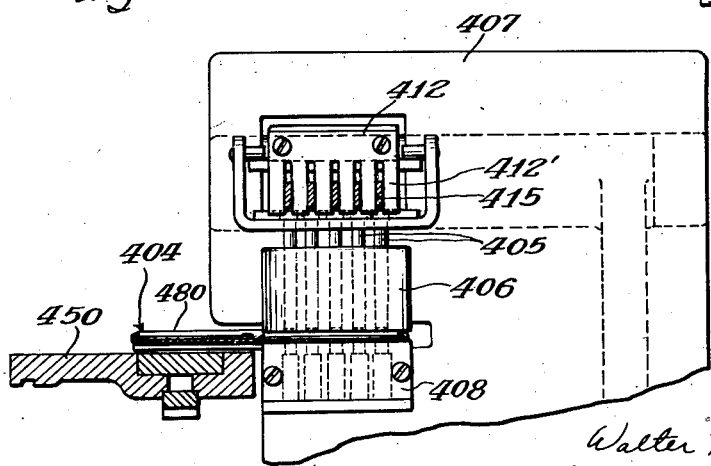
Fig. 22 is a view taken substantially on the line 22—22 on Fig. 19.

A bell crank 410 is provided for actuating the punches and is mounted at 411 on the head 407, with one arm 412 extending through the head 407 to a position over the upper ends of the punches 405, and by rocking movement of the bell crank 410 the desired downward actuation of the selected punches 405 is effected as will be explained. In Figs. 19 and 22, the headed upper ends of the punches 405 are shown supported in a bail 414 which depends pivotally from the arm 412, so that when the actuating arm 412 moves to its raised or retracted position, the punches are also elevated and withdrawn from the holes which have been punched thereby. Downward rocking movement of the actuating arm 412 is transmitted to the selected punches 405 by a plurality of selector bars 415 which project through a slotted guide plate 412' on the end of arm 412 and which are movable selectively into the space between the arm 412 and the heads of the punches 405. Each selector bar 415 is shiftable along a generally horizontal path from its inactive position shown in Fig. 19, to its active position, shown in Fig. 23, and in its active position the head 416 of such a bar lies between the arm 412 and the head of the associated punch 405 so that downward rocking of the arm 412 depresses the selected punch as shown in Fig. 23. When a selector bar 415 remains in its idle or inactive position, shown in Fig. 19, however, it rests on the bail 414, at one side of the punch head so that the arm 412 may rock downwardly without depression of the associated punch.

The other arm 418 (Figs. 19, 20 and 23) of the bell crank 410 extends downwardly within the housing 402 to operate the arm 412 and has its lower end pivoted at 419 to one one of an actuating pitman 420. The pitman 420 has its other end connected to an eccentric 421 which is carried by a main operating shaft 422, so that the punch actuating arm 412 is rocked downwardly in each revolution of the operating shaft 422.

The present punching device 61 is so arranged that a working or operating cycle takes place in a single revolution of the main operating shaft 422, and the preferred means for driving the shaft 422 includes a one-revolution clutch 425, such as is shown in Figs. 20, 26 and 27. This clutch, which may be of the form disclosed in my copending application, Serial No. 179,438, December 11, 1937, comprises a driving clutch member 426, mounted rotatably on the shaft 422, and a complemental driven clutch member 427, non-rotatably secured to the shaft 422 and shiftable into and out of operative clutching relation with the driving member 426.

The driving clutch member 426 may be driven in any preferred manner, as by a pulley 428 formed integrally therewith, the pulley preferably being driven by a belt 429 (Figs. 1 and 20) from an individual electric motor M2 as indicated in Fig. 33.

As shown in Fig. 20, the driven clutch member 427 takes the form of a sleeve surrounding the shaft 422 adjacent to the driving member 426, and on adjacent ends the members 426 and 427 have a plurality of complemental clutch teeth which may be engaged by relative approaching movement of the two members. Such engaging movement is obtained by a plurality of springs 428' (Fig. 20) mounted in registering opposed bores in the member 427 and a hub 429' pinned on the end of the shaft 422. A plurality of longitudinally projecting splines 430 are provided on the hub 429' to slidably engage complemental slots in the clutch member 427 throughout its required range of movement, and hence rotation may be transmitted from the clutch member 426, through the member 427 to the hub 429', and thence to the operating shaft 422.

A declutching member 431, pivoted at 432 (Fig. 27), is normally urged by a spring 433 into contact with the periphery of the clutch member 427 to disengage the clutch member 427 at the end of each revolution of the shaft 422. A cam surface 434 is formed on the declutching member 431 in the path of a pin 435 which projects radially from the clutch member 427. The cam surface 434 is so disposed that in rotation of the shaft in the direction indicated in Fig. 27, the pin 435 rides up on the cam surface 434 to retract the clutch member 427 to its released position of Fig. 20, the parts being so proportioned that the pin 435 comes to rest on a stop surface 436 of the declutching members 431, to thereby maintain the clutch disengaged.

A release lever 440 is provided to shift the declutching member to an ineffective position and this initiate a cycle of operation. This lever 440 is pivoted at 441 beneath the shaft 422 and normally rides against the clutch member 427 with a projecting shoulder 442 overlying the free end of the declutching member 431. A spring 443 normally maintains the release lever 440 in the position shown in Fig. 27, and by shifting the release lever downwardly the clutch member 427 may be freed for engagement with the driving clutch member. In the resulting rotation of the clutch member 427, its pin 435 strikes the lever 440 so as to permit immediate return of the declutching member 431 to its operative position of Fig. 27.

The desired releasing movement of the declutching lever 440 is attained in the present embodiment by mounting the pivot 441 thereof on the guided armature 445 of a solenoid 446, the operation of the solenoid being controlled by a switch S1 as will be explained.

The carriage 404, as shown in Figs. 19, 20 and 22, is mounted and guided on a supporting rail 450 along the forward side of the base 400, within the housing 402, and in the form shown in Fig. 19, is normally biased toward the right by means of a flexible band 451 which extends from the carriage over guide pulley and to a spring tensioned winding drum 453. The normal tendency of the carriage to shift to the right is controlled by a toothed ratchet or rack 454 mounted on the carriage 404 and engaged by indexing or escapements dogs 455 and 456, and this escapement mechanism may be actuated manually by means of a spacing key 457 (Figs. 1 and 19) or automatically during the machine cycle.

Thus as shown in Fig. 19, the escapement dogs 455 and 456 are formed on corresponding arms 458 and 459 of similar bell crank levers pivoted on the frame on a common axis 460. These bell crank levers have similar depending arms 458' upon which springs 461 act so as normally to urge the dogs 455 and 456 toward operative engagement with the ratchet teeth 454.

A rocker lever 465 (Fig. 19) is mounted on a shaft 466 adjacent to the operating shaft 422 in such a relation that the ends of the bell crank arms 458 and 459 extend beneath the shaft 466 and on opposite sides of the rocker lever 465 and this operates to alternately engage and disengage the escapement dogs. The lever 465 has pins 467 and 468 on its oppositely projecting ends 465' and 465", the pin 467 being on the end 465' adjacent to the shaft 466 and overlying the bell crank arm 458, and the pin 468 being on the end 465" and overlying the bell crank arm 459. Thus the spring tension on the bell crank arm 458, in addition to urging the dog 456 into its operative position, also acts through pin 468, lever 465 and pin 467 to hold the escapement dog 455 out of engagement with the rack 454 as shown in Fig. 19.

When the carriage 404 is to be spaced the rocker lever 465 is rocked in a counter-clockwise direction to withdraw the escapement dog 456 and simultaneously permit approaching movement of the dog 455 to engage the succeeding tooth of the rack; and this action is attained either manually by the spacing key 457 or automatically through the medium of the operating shaft 422. To this end the shaft 422 has an actuating tooth 470 so arranged thereon that in the latter portion of the operating cycle it engages a tooth 471 on the rocker lever 465 and imparts the requisite rocking motion to the lever. If desired, a stop pin 472 may be provided to limit such rocking of the lever 465.

The spacing key 457 is pivoted on the shaft 466 to effect manual spacing of the carriage 404 and intermediate its ends the key has a lug 475 projecting rearwardly over the bell crank arm 468. Thus when the spacing key 457 is depressed the dog 456 is retracted, and since by this action the rocker lever 465 is released, the other dog 455 is biased simultaneously by its spring 461 into its operative position so as to engage the succeeding tooth of the rack 454; and upon release of the spacing key 457, the dog 456 returns to its operative relation with the rack in its new position so as to retract the dog 455 and condition the escapement for its next operation.

For the purpose of supporting the printing and control device frame in working position, the carriage 404 is provided with spaced horizontal end members 480 and 481, Figs. 19, 22, 24 and 25, having opposed grooves 482 and 483 adapted to receive the end edges of a control frame 41. Thus a frame 41, positioned in a horizontal plane, may be inserted edgewise into the grooves 482 and 483 to the working position shown in Fig. 20 wherein the control area 53 is in proper relation to the punches 405, and means is provided for releasably securing the frame in this position on the carriage. This securing means, as herein shown, is incorporated in the right hand end member 481, which, for this purpose, is preferably of hollow construction as shown in Figs. 24 and 25.

The present form of securing device is constructed to engage a V-shaped notch 484 formed in the right end of the frame 41, and a pivoted dog 485 is provided within the end member 481 and may be engaged with this notch. Engaging movement is imparted to the dog 485 by a cam surface 486 on a slidable plunger 487 mounted in the end member 481. The cam surface 486 is effective to engage the dog 486 with the notch 484 when the plunger 487 is moved outwardly from the position of Fig. 25 to the position of Fig. 24, and such movement of the plunger is caused by a spring 488.

Normally, when the carriage 404 is unloaded, the plunger 487 is locked in its retracted position by a lug 489 that is carried on a pivoted arm 490 and which is engageable with a sloping latching shoulder 491 on the plunger. As shown in Fig. 25, the arm 490 has its end lying in the path of the rear edge of the frame 41, and is normally held in its forward or latching position by a spring 492. When, however, a frame 41 is pushed rearwardly into the mounting slots of the carriage, the arm 490 is shifted rearwardly to the position shown in Fig. 24 so as to release the plunger 487 and permit forward, dog-actuating movement. Thus the V-shaped tooth of the dog 485 is engaged with the V-shaped notch 484 of the frame so as to hold the frame against the forward or unloading force exerted by the arm 490. After completion of the desired punching operations, the frame 41 may be released and discharged from the carriage 404 merely by rearward actuation of the plunger 487, so as to release the dog 485. The force of the unloading arm 490 then acts through the V-form of the notch 484 to shift the dog 485 out of the way as the frame 41 moves to an exposed extending position wherein it may easily be grasped by the operator. The plunger 487 is then again locked in its rearward position by the lug 489 as an incident to the unloading of the frame 41 so as to condition the mechanism for the next loading operation.

As shown in Figs. 19 and 20, the left hand end member 480 of the carriage 404 carries a projecting operating handle 495 whereby the operator may shift the carriage to its initial or left hand position, and in addition, carries an indicating pointer 496 which cooperates with a scale 497 along the upper edge of the opening 403 to show the position of the carriage.

For the purpose of selectively determining the particular punches 405 which are to be operated in each cycle of the punching device 61, the present invention provides a keyboard 71 at the front of the device (Fig. 1), this keyboard serving to control the positioning of the selector bars 415; and in addition, means is provided whereby the setting of the selector bars 415, the spacing of carriage 404, and the operation of the main shaft 422 of the punch may be similarly controlled by the number keys 67b of the embossing machine 60 so that the punch operates simultaneously with the embossing of numbers by the embossing machine.

As shown in Figs. 19, 21, 28 and 29, the keyboard 71 of the punch has number keys 500 from 1 to 9, carried by key supporting levers 501, mounted on a shaft 502 within the housing 402. All of the keys 500 are biased upwardly by spring means, the even numbers having individual springs 503, and the other keys being biased by means presently to be described. The keys 500 are interlocked by a series of balls 505 mounted in a slotted race on the interior of the housing 402 and proportioned so as to be in the downward path of the levers 501 and thus prevent depression of more than one key at a time.

Figure 28:
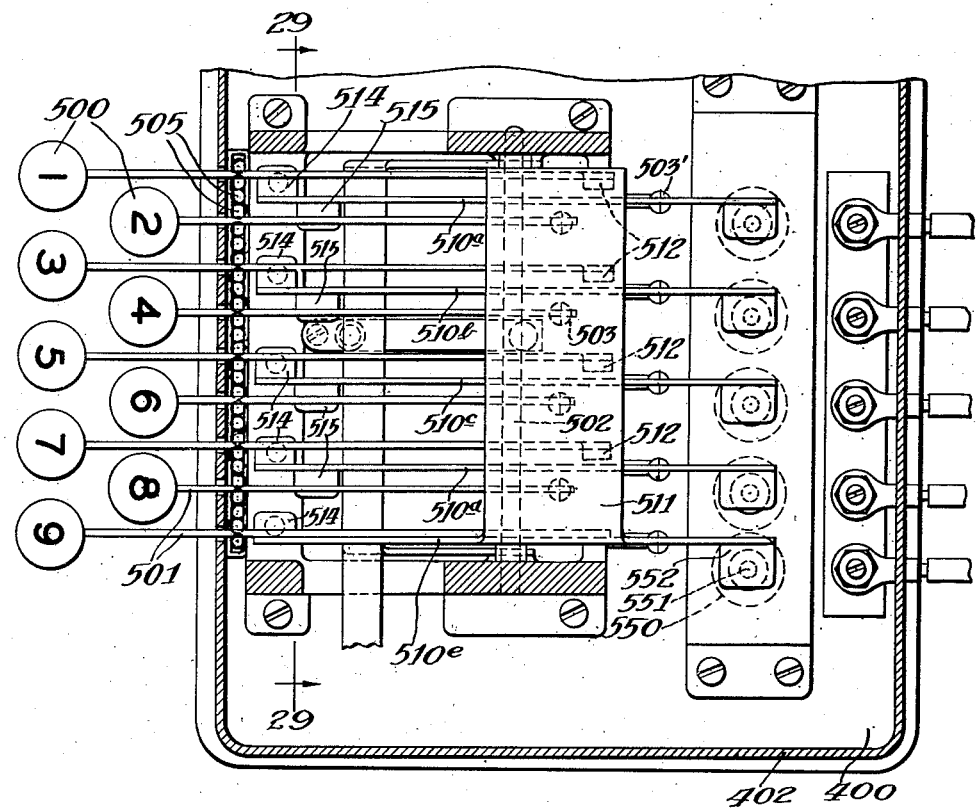
Fig. 28 is a horizontal sectional view taken substantially on the line 28—28 on Fig. 21.
Figure 29:
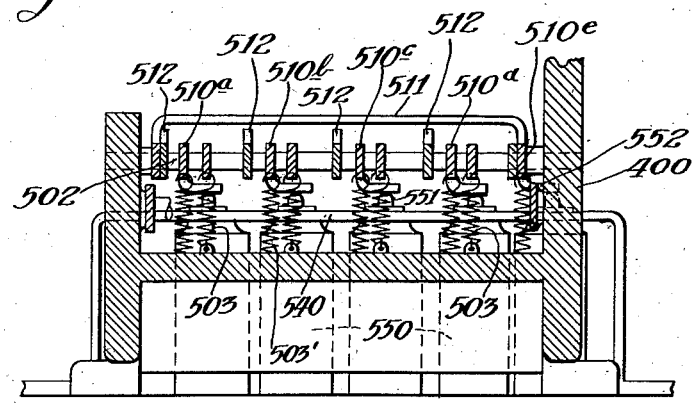
Fig. 29 is a transverse sectional view taken substantially on the line 29—29 on Fig. 28.

Means is provided whereby depression of a selected key 500 of the keyboard 71 causes actuation of the proper selector bar or bars 415, and this means is so constructed as to permit actuation under the control of either the keys 500 of the punch or the number keys 67b of the embossing machine. To this end a plurality of transmitting levers 510 are mounted on the shaft 502 for actuation by the key supporting levers 501, lever 510a being located between the levers from numeral keys 1 and 2, lever 510b between numeral keys 3 and 4, lever 510c between keys 5 and 6, lever 510d between keys 7 and 8, and lever 510e beyond the lever 501 which supports the 9 key, as shown in Figs. 28 and 29.

As will hereinafter be described in detail, the transmitting levers 510 are operable to actuate the selector bars 415a to 415e, and provision is therefore made for actuation of the transmitting levers 510 by the keys 500 in accordance with the code shown in Fig. 1a.

Thus the lever 510e is provided with a bail 511 projecting rearwardly from the shaft 502 so as to overlie the rearwardly projecting ends of the key supporting levers 501, and the levers 501 from the odd numbered keys 500 have upwardly projecting lugs 512 at their rear ends which engage the bail 511 and cause actuation of the lever 510e (or 9-transmitting lever) whenever an odd numbered key 500 is depressed. It will be understood, of course, that the even numbered keys 500 have their supporting levers 501 formed sufficiently short at their rear ends to avoid actuation of the bail 511.

The other transmitting levers 510 are actuated from the keys 500 by lugs 514 and 515 which project in opposite directions from the forward portions of the levers 510, the lever 510a having its lug 514 projecting beneath the lever of the 1 key and its lug 515 projecting beneath the 2 key. The levers 510b, 510c and 510d similarly formed and related to the adjacent key supporting levers, while the transmitting lever 510e has but a single lug 514 which projects beneath the supporting lever of the 9 key.

With this construction, the depression of an even numbered key merely causes actuation of its directly associated transmitting lever 510, while the depression of an odd numbered key additionally functions through the bail 511 to cause simultaneous actuation of the 9 transmitting lever 510e; thereby resulting in actuation of the transmitting levers 510 in conformity with code shown in Fig. 1a. Springs 503' acting on the rear ends of levers 510 act to maintain these levers normally in the positions of Fig. 21.

Operating impulses are transmitted to the selector bars 415 from the transmitting levers 510 by means such as a plurality of Bowden wires 520, one of which is operatively connected between each lever 510 and the corresponding selector bar 415. Thus as shown in Figs. 19, 21, 22 and 28, the lug 514 of each lever 510 overlies a vertically slidable plunger 520' which acts on the upwardly projecting end of one of the wires 520, and these wires are so guided by their casings 521 that their other ends each act on a vertically slidable plunger 522' which underlies the horizontal arm 522 of corresponding bell cranks 523 which support the right hand ends of the selector bars 415. The bell cranks 523 are pivoted on a shaft 523' and as shown in Fig. 19, the upwardly extending arms 524 of the bell cranks 523 have pivoted connections with their selector bars 415. Thus when a bell crank 523 is rocked counterclockwise by its Bowden wire 520, against the force of its return spring 525, the selected or associated bar 415 is shifted to its operative position of Fig. 23.

Although return springs 525 are associated with the selector bars 415, there is preferably also provided a positively acting withdrawing means operable after completion of the punching operation to return the bars 415 to their inoperative positions of Fig. 19. To this end a bail 526 is pivoted on the shaft 523' so as to overlie the arms 522 of all of the bell cranks 523, and a return lever 527 has one end overlying the bail 526 for the purpose of actuating the same. The return lever 527 is pivoted intermediate its ends on the shaft 460 so that a cam roller 529 on its other end may be actuated by a cam 530 on the shaft 422. A spring 531 maintains the roller 529 against the cam 530, which cam is of such a form that the end of the lever over the bail 526 is normally elevated, and is depressed only near the terminal portion of the machine cycle.

Figure 31:
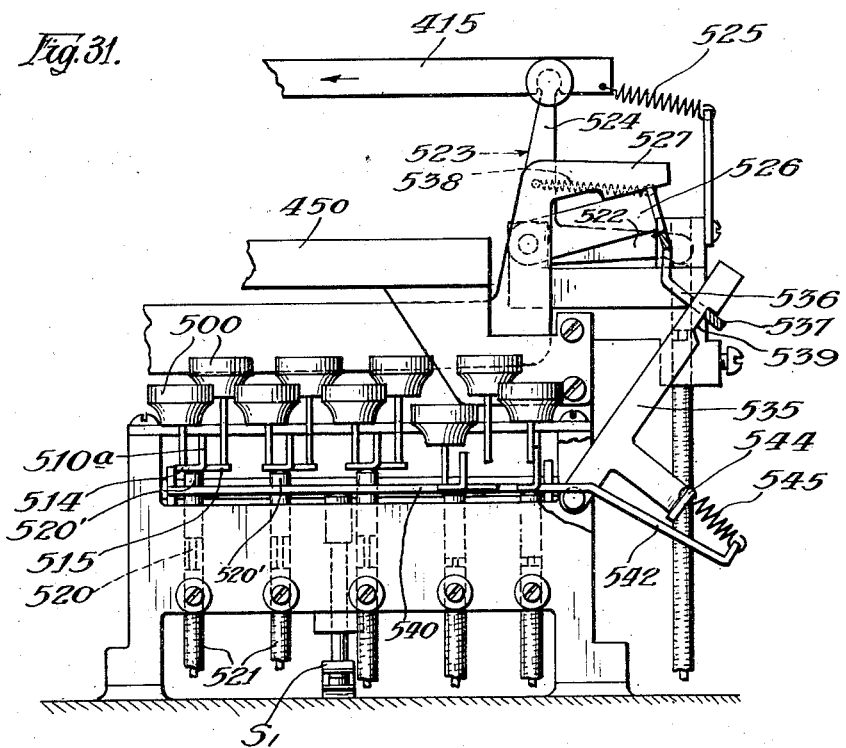
Fig. 31 is a fragmentary detail view of a portion of the mechanism illustrated in Fig. 30 but showing the parts in another position.
Figure 32:
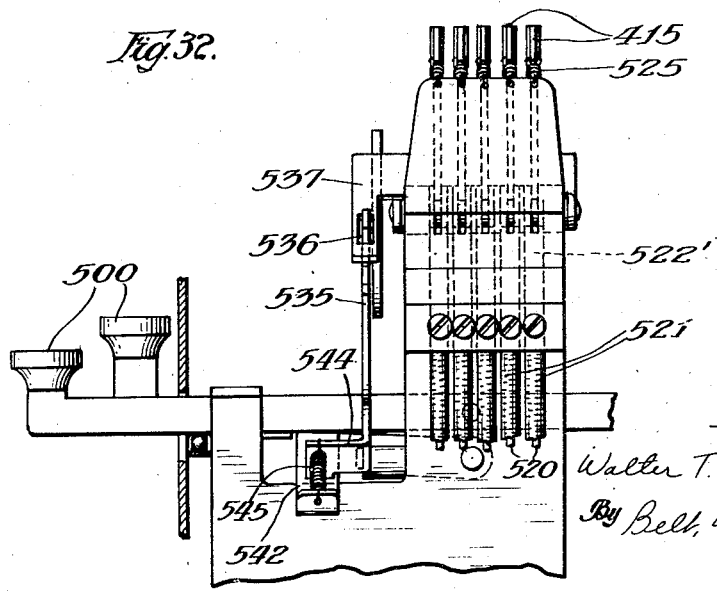
Fig. 32 is a fragmentary side view looking in at the right-hand side of Fig. 31.

As a safety measure, the present punching device 61 has a safety latch mechanism to guard against a second or undesired punching operation when a key 500 is held in its depressed position for too long a period. In the event of such continued depression of a key the associated Bowden wire 520, in the positive restoring movement of the bail 526, would stretch its supporting casing, and after release of the bail 526 would normally operate to again actuate the associated selector bar 415. This safety mechanism as herein shown comprises a latch 535 pivoted on the machine frame and projecting through a slot 536 in an arm 537 which depends rigidly from the bail 526. The bail 526, by means of a spring 538 acting between the bail and the restoring lever 527, is normally elevated, as shown in Fig. 19, so that the latch 535 is inactive, but when the bail 526 is depressed in a restoring operation, the arm 537 is lowered to the position of Fig. 31 wherein it may be engaged and retained by a notch 539 in the latch 535. Such restraint of the bail 526 takes place only in the event one of the keys 500 (or one of the transmitting levers 510) is still depressed at the time of the restoring operation.

To attain this desired operation, the latch 535 is associated with a bail 540 which is mounted on a shaft 502' and underlies the forward ends of the transmitting levers 510. This bail 540 overlies an actuating plunger 541 of the switch S₁ (Figs. 19, 28, 31, 33 and 34) for the purpose of closing this switch and causing operation of the punch immediately after setting of the selected bars 415; and for the purpose of controlling the latch 535, the bail 540 has an arm 542 projecting from the right hand end of the machine frame. When all of the keys 500 (and the transmitting levers 510) are in their normal positions of Fig. 19, the bail 540 is maintained in its elevated position by a spring 543 which elevates the plunger 541, and the projecting arm 542 of the bail 540 engages a lug 544 on a projecting portion of the latch 535 to hold the latch out of operative latching relation to the arm 537. When the bail 540 is depressed, a spring 545, acting between the latch and the arm 542 of the bail, causes the latch to be urged toward its operative position, and if this condition prevails at the time of the restoring operation, the latch 535 takes effect on the restoring bail 526 and thereby holds all of the selector bars 415 in their inactive positions until the keys 500 or transmitting levers 510 have been released. Upon such release, the arm 542 engages the lug 544 of the latch so as to release the latch and condition the punch for further normal operation.

In the present embodiment, the operational control and punch selection in the punching device 61 by means of the keys 67b of the embossing machine 60 is preferably attained through means of an electrical character. To this end an individual electrically operated actuator is provided for each of the transmitting levers 510, this means as herein illustrated being in the form of a plurality of solenoids 550, one mounted in a vertical position beneath the rear end of each of the levers 510, and each having an armature 551 shiftable vertically so as to engage a lug 552 on the associated lever 510 and thereby actuate the lever to a punch-selecting position.

When this form of electrical means is employed, the actuation of the several solenoids and their associated levers 510 in accordance with the code shown in Fig. 1a is determined by the electrical circuits controlled by the keys 67b of the embossing machine. The circuits employed in Method B are diagrammatically illustrated in Fig. 33 of the drawings. In this circuit the power is supplied from power leads $L_1$ and $L_2$, the embossing machine motor $M_1$ being connected by wire 560 to lead $L_1$, and by wires 561, 562 and switch 563 to lead $L_2$ so that switch 563 constitutes the main control switch. One terminal of the punch motor $M_2$ is also connected to lead $L_1$ by a wire 564 and its other terminal is connected to the wire 562 by series connected wires 565 and 566, a main punch control switch 567 and wires 568 and 569. Thus the punch motor $M_2$ operates only when both switches 563 and 567 are closed.

A plurality of circuits are provided to energize the punch selecting solenoids 550 under the control of the number keys 67b and in accordance with the code shown in Fig. 1a. These circuits are all controlled by a main conditioning switch 570, this switch being normally open, and being arranged for closure by the conditioning key 70 located on the embossing machine 60. This key may be latched in its depressed or switch-closing position by a latch element 572. With the circuits of the punch selecting solenoids 550 thus controlled by the conditioning switch 570, the number keys 67b may be used in their normal manner in embossing street numbers or other data on the printing plate 42, or by closure of the conditioning switch 570, may be endowed with a punch controlling function so as to permit simultaneous formation of the control data on the frame 41 and the printing plate 42.

For this purpose one end of each solenoid 550 is connected by a wire 573 to lead $L_1$, while the other ends of the solenoids are connected to the conditioning switch 570 by parallel control circuits each of which includes switch means controlled by selected ones of the keys 67b.

Since the code shown in Fig. 1a requires that the 9 solenoid, (550e) be energized whenever an odd numbered key 67b is depressed, similar switches 574 are provided for closure by such odd numbered keys and are arranged in parallel circuits from the conditioning switch to the other side of the solenoid 550e. These parallel circuits are formed by a lead wire 575 extending from the conditioning switch 570 and having branch leads 576 to corresponding terminals of each of the switches 574, and a lead wire 577 extending from the other end of solenoid 550e and having branch leads 578 to the other terminal of each switch 574.

In accordance with the code shown in Fig. 1a, the solenoids 550a to 550d must be selectively energized when the corresponding even numbered keys 67b are actuated, and for this purpose similar switches 580a to 580d are mounted for closure by the 2 key, the 4 key, the 6 key and the 8 key respectively. One terminal of each switch 580 is connected to the lead wire 575 by branch leads 581, while wires 582a to 582d connect the other terminals of the 580 switches to corresponding solenoids 550a to 550d. Thus by depression of any selected even numbered key 67b, the corresponding solenoid 550 may be energized.

The odd numbers in the code shown in Fig. 1a require, of course, in addition to the actuation of the 9 solenoid, the actuation of predetermined one of the other solenoids 550, and to attain this result the odd numbered keys 67b are each arranged to close one of the 580 switches. Thus each of the odd numbered keys 67b from 1 to 7 has a lateral extension 585 so positioned that depression of a particular odd numbered key closes not only its switch 574 but also the switch 580 of the next higher even numbered key.

To effect spacing of the punch carriage 404 when a zero is embossed on the printing plate, the zero key of the embossing machine is arranged to close a switch 590, one terminal of which is connected by a wire 591 to the lead wire 575. The other terminal of the switch 590 is connected by a wire 592 to one end of a spacing solenoid 593 which at its other end is connected to the power lead L₁. As shown in Figs. 19 and 33, the spacing solenoid has an armature 594 which acts upon a spacing lever 595 of the punch. This lever 595 depends loosely from the shaft 466 adjacent to the rocking lever 465, and has an arm 596 projecting to the left, (Fig. 19) with a lug 597 projecting laterally so as to overlie the left hand end of the rocker lever 565. Thus when the zero key of the embossing machine is depressed, the spacing lever 595 is rocked to a counter-clockwise direction by the solenoid 593 and the carriage 404 is spaced in the same manner as by the spacing key 457.

As a result of the actuation of any one or more of the solenoids 550, the corresponding transmitting-levers 510 are rocked so as to depress the bail 540 of the punch 61 and thus close the clutch control switch S₁. As shown in Fig. 33, the terminals of the switch S₁ are connected by wires 600 and 601 to the lead 575 and to one end of the clutch control solenoid 446, while the other end of the solenoid 446 is connected to lead L₁ by a wire 602. Hence, when the switch S₁ is closed by the bail 540, the operating shaft 422 is actuated through one revolution so as to punch the frame 41 in accordance with the setting of the selector bars 415.

Method B operation

It will be recalled that when printing and control devices 40 are to be made by Method B, the representations of the individual digits of the numerical control data 58 are formed simultaneously on the control area 53 of the frame 41 and the printing plate 42 and that such representations of the individual digits are formed in a reversed order so that the digit of the lowest order is invariably represented in a predetermined relation to the borders of the control area and the printing plate. Thus, after forming the name and address data 55 and 56 on the printing plate 42 while using the normal character spacing movements of the carriage 75, the control data is formed while utilizing an automatic back-spacing movement of the carriage 75. In such Method B operation the punch device 61 of Fig. 19 is employed, since the carriage 404 thereof has a character spacing movement from left to right as indicated in Figs. 3a and 19.

Thus, a frame 41 with its control card 53 thereon is inserted into the supporting slots 482 and 483 on the carriage 404 of the punch, and the carriage 404 is shifted to its left-hand position so as to condition the punch for the performance of a punching operation in the most right-hand portion or position on the control area 53. A blank plate 42 is then clamped in the jaws 99, and while the conditioning switch 570 is in its open position, the name and address data 55 and 56 are embossed on the plate.

The carriage 75 of the embossing machine is then tabulated to its most right-hand position, as by means of the tabulating mechanism of the machine, and the conditioning switch 570 is locked in its closed position by means of the conditioning key 70. Hence the punching device is connected or conditioned for control by the number keys 67b of the embossing machine so that the numerical control data represented by the depression of such keys 67b will be simultaneously formed on the printing plate 42 and the control area 53 of the frame 41.

In addition, the conditioning switch 570 acts to provide for automatic back spacing of the embossing machine carriage 75, as required in Method B operation. To this end, a back spacer solenoid 610 is provided on the frame 68 of the embossing machine, and its armature 611 is connected by a link 612 (Fig. 7) to a rearward extension 613 of the arm 191. When energized, the armature 611 is raised so as to actuate the back spacer rod 181. As shown in Fig. 33, one end of the solenoid 610 is connected to line L₁ by a wire 610' while the other end is connected by wire 614, normally open switch 615, and wire 616, to wire 575.

In accordance with the present invention the switch 615 is closed automatically at or near the end of each embossing cycle, and preferably this action is attained through the spacing rod 200 which is reciprocated in each embossing cycle. Thus, as shown in Figs. 7, 9 and 33, the switch 615 is mounted on the machine frame adjacent to the spacing rod, and is so related thereto that when the spacing rod is retracted to the left (Fig. 9) so as to be inoperative upon the escapement arm 196, a tooth 617 on the spacing rod 200 is positioned directly over the switch 615. Hence, a downward movement of the spacing rod 200 while retracted to the dotted line position of Fig. 9 operates to close the back spacing switch 615. Also it will be noted that in such operation, the retracted spacing rod 200 idles past the tooth 198 of the character spacing arm 196 so that the escapement is ineffective to cause the normal character spacing movement to the right.

This desired retraction of the spacing rod 200 is attained automatically under the control of the conditioning key 70 by means of a solenoid 620 (Figs. 7, 9 and 33) connected by wires 621 and 622 between wires L₁ and 575, and having horizontally retractible armature 623 pivotally connected by a link 624 to the spacing rod 200.

Therefore, in producing, by Method B, the numerical data "345" shown in Figs. 3 and 3a, the "5" key of the embossing machine would first be depressed. Such actuation, of course, would cause selection, positioning and actuation of the proper embossing dies, and simultaneously would close the switch 580c and the associated switch 574. The means whereby such actuation of the switches 580c and 574 is attained has been generally described and is shown diagrammatically in Fig. 33, while the actual physical structure employed is illustrated in Figs. 5 and 7. Thus, the several normally open switches 574 and 580, as well as the conditioning switch 570, are mounted on a supporting bar 630 along the front of the embossing machine keyboard, as shown in Figs. 5 and 7, so that the switches project rearwardly parallel to the several supporting levers of the number keys. As shown in Fig. 5, one switch 574 is located on the left-hand side of the supporting lever of each odd numbered key, and the lever of each odd numbered key has an arm 631 projecting to the left therefrom so as to close the associated switch 574. Similarly the lever of the zero key has an arm 632 overlying the switch 590.

The switches 580 are located to the left of their associated even numbered keys, as shown in Fig. 5, and the arms 585, shown diagrammatically in Fig. 33, project from the levers of the adjacent odd numbered keys so as to overlie the adjacent switches 580. Hence, when the "1" key is depressed, the associated switch 574 as well as the switch 580a are closed. Similar operation follows the depression of the other odd numbered keys, to obtain the grouping required by the code shown in Fig. 1a.

On each even numbered key a similar arm 634 projects laterally to overlie the adjacent switch 580 so as to close the proper switch when the even numbered keys are depressed.

Thus when a particular number key 67b is depressed, the corresponding printing character is embossed on the printing plate 42, and the corresponding, properly coded, control data is formed on the control area of the frame 41, and proper forward spacing of the carriage 404 and proper back spacing of the embosser carriage 75 take place automatically at the conclusion of the necessary forming operations.

Method A operation

In forming printing and control devices in accordance with Method A, the carriage 75 of the embossing machine moves in the normal or right-hand direction in Fig. 2a since in this method the several digits of the supplemental data are formed in their natural reading sequence, the highest order of such numerical data being first formed. The frame 41 must therefore be moved from right to left as indicated in Fig. 2a, and prior to the formation of the supplemental data the embossing machine carriage 75 and the carriage of the punch are both tabulated to positions determined by the number of digits in the supplemental data.

Figure 30:
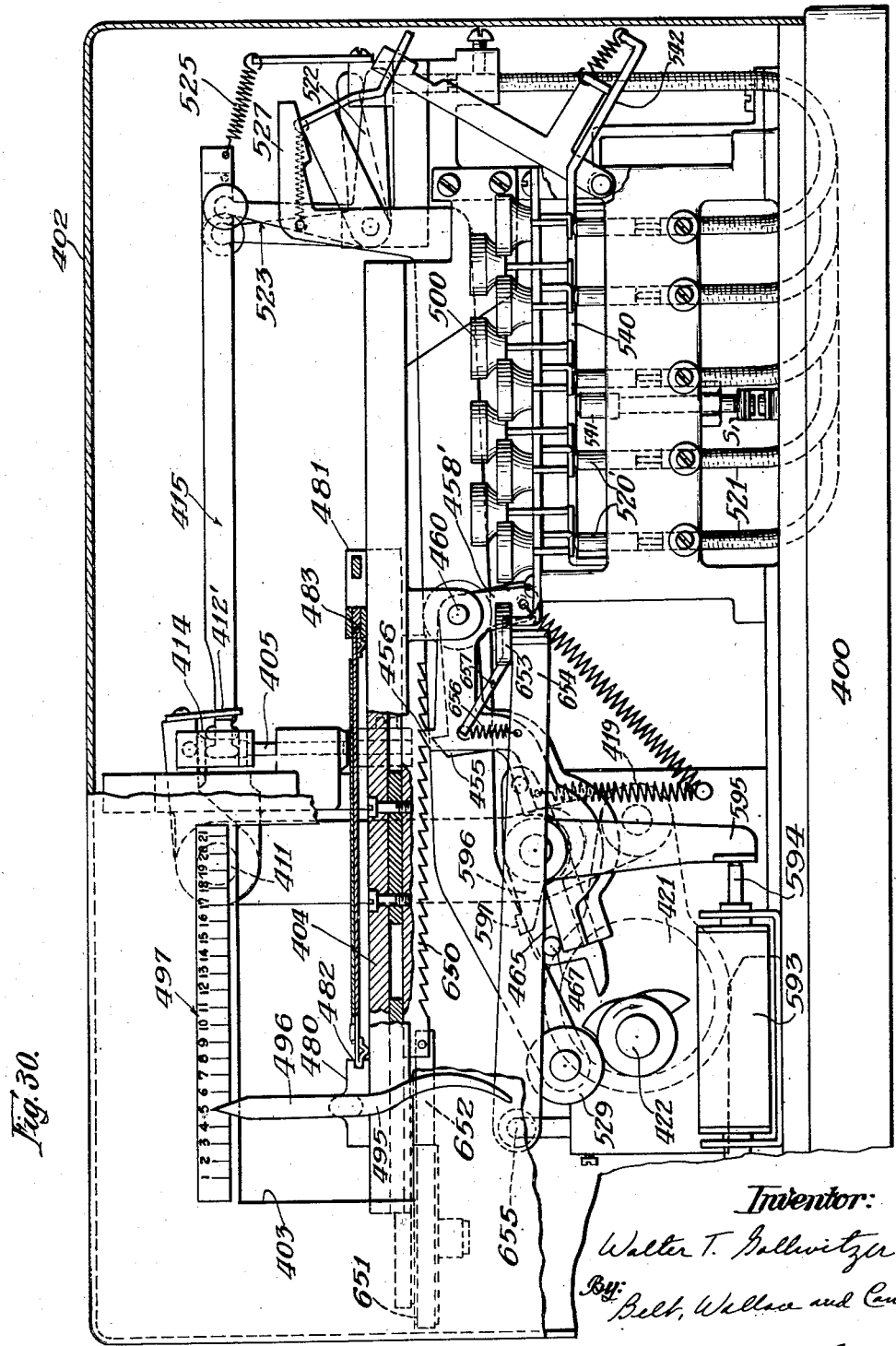
Fig. 30 is a view similar to Fig. 19 but showing an alternative arrangement.

The punching device 61 is constructed substantially the same as shown in Figs. 19 to 29 for use in Method A operation, and such a punching device being shown in Fig. 30. In this form a toothed rack 650 is provided which has its teeth facing to the left, or reversed with relation to the corresponding rack 454 of Fig. 19, and the carriage 404 is normally biased to the left by a spring tensioned winding drum 651 and a flexible member 652. The escapement dogs 455 and 456 are, of course, reversed to conform with the reversed relationship of the toothed rack 650, the general form of the supporting levers and actuating mechanism for the escapement dogs 455 and 456 remaining the same as in Fig. 19. In the form shown in Fig. 30, a different form of spacing key 653 is illustrated, the key 653 being carried on a lever 654 which extends to the left and is pivoted on the machine frame at 655. A spring 656 acting between the lever 654 and an extension 657 of one of the frame members, maintains the spacing key 653 in a normally elevated position, and when the key 653 is depressed, an intermediate portion of the lever 654 engages the top of pin 467 on the rocker member 465 and actuates the rocker member 465 and the escapement pawls 455 and 456 through a character spacing movement.

In the preparation of the printing and control devices in accordance with Method A, the automatic back-spacing movement of the Method B is, of course, eliminated so that the back-spacing mechanism and the disabling solenoid for the spacing rod 200 are eliminated from the control circuits. Thus the electrical circuit for operation in accordance with Method A are illustrated in Fig. 34, this circuit of Fig. 34 being identical with that of Fig. 33 except that the back spacer solenoid 610 and its switch 615, and the spacing rod solenoid 620 have been eliminated.

It will be apparent from the foregoing description that I have provided an arrangement whereby directly producible and indirectly producible data representations may be simultaneously produced in printing and control devices, the directly producible representations being in the form of type characters and the indirectly producible representations being in the form of perforations. It will be understood, however, that the arrangement might be utilized to produce other kinds of data representations without departing from the purview of my invention.

Furthermore, I have provided an arrangement whereby keys or the like operable to produce type characters may be utilized to not only bring about the production of type characters but also to produce control means related to the type characters and, in accordance with my invention, manually controlled means are provided for bringing about such optional results upon operation of the keys or the like.

In addition to the foregoing I have provided an arrangement for producing control perforations or the like which may be operated independently to produce such control perforations or which may be operated in conjunction with an arrangement for producing directly readable or reproducible data representations such as impressions or type characters.

Furthermore, while I have explained two different methods of utilizing the apparatus to which my invention pertains, it is to be understood that these are illustrative and not exclusive and that, therefore, other methods of operation are to be considered as being within the purview of my invention.

Thus while I have illustrated and described selected embodiments of my invention it is to be understood that these are capable of variation and modification and I therefore do not wish to be limited to the precise details set forth but desire to avail myself of such changes and alterations as fall within the ambit of the following claims:

I claim:

1. In a machine of the character described for forming printing and control devices, the combination of an embossing machine embodying embossing means for forming printing characters on the printing section of such a device, including number-forming means and number keys for controlling the same, control data forming means for forming coded control data on the control area of such a device, said control data forming means including a plurality of punches and key controlled means operable mechanically upon actuation of any one of its keys to selectively render said punches operative in accordance with a predetermined positional code of numbers, electrical means operable selectively to cause operation of said punches and including switch means actuated by the number keys of said embossing machine, said electrical means including circuits operable to effect selection of said punches in accordance with said code, and a master conditioning switch operable to disable said electrical means or to render the same operative at the will of the operator.

2. A machine for forming printing and control devices having separably related printing and control sections, said machine comprising embossing means for forming printing characters on the printing section of such a device, an embossing machine carriage for supporting and automatically advancing such printing section with relation to said embossing means, a plurality of punches for forming codal control data on said control section, a punch carriage for supporting and automatically advancing the control section with relation to said punches, said embossing means including means for forming numbers on said printing section to provide either address or supplemental printing data thereon, manually actuatable means operable to select and cause embossing operation of said number forming means, normally inoperative means controlled by said selecting means operable simultaneously to select and cause operation of said punches in accordance with a predetermined number code to form control data on said control section corresponding to the numerical data formed on the printing section, and a conditioning means operable to render said last mentioned means operative.

3. A machine as defined in claim 2 having a normally inoperative power actuated back spacing means for said embossing machine carriage controlled and rendered operative by said conditioning means to back space said embossing machine carriage during periods of simultaneous operation of the embossing machine carriage and the punches.

4. A machine for forming printing and control devices having separately related printing and control sections, said machine comprising embossing means for forming printing characters on the printing section of such a device, an embossing machine carriage for supporting and automatically advancing such a printing section with relation to said embossing means, a plurality of punches for forming codal control data on said control section, a punch carriage for supporting and automatically advancing the control section with relation to said punches, a carriage spacing mechanism for said punch carriage, said embossing means including means for forming number printing characters on said printing section to provide either address or supplemental data thereon, manually operable means operable to select and cause embossing operation of said number forming means, normally inoperative means controlled by said selecting means operable simultaneously to select and cause operation of said punches in accordance with a predetermined number code to form control data on said control section corresponding to the numerical data formed on the printing section, and to cause operation of the spacing means of said punch carriage when a zero is formed by said embossing means, and a conditioning means operable to render said last mentioned means operative.

5. In a machine of the character described for forming printing and control devices, the combination of an embossing machine embodying embossing means for forming printing characters on the printing section of such a device, including means for forming numbers from 1 to 9 and zero, and number keys for controlling the same, control data forming means for forming coded control data on the control area of such a device, said control data forming means including a plurality of punches and key controlled means operable mechanically upon actuation of any one of its keys to selectively render said punches operative in accordance with a predetermined positional code of numbers including a blank unaltered space, electrical means operable selectively to cause operation of said punches and including switch means actuated by the number keys of said embossing machine, said electrical means including circuits operable to effect selection of said punches in accordance with this code, a circuit including a switch actuated by the zero key of the embossing machine, an electrically actuated means in said last mentioned circuit operable to effect a spacing operation with relation to said punches, and a master conditioning switch operable to disable said electrical means or to render the same operative.

6. A machine of the character disclosed for forming printing and control devices having separably related printing and control sections, said machine comprising embossing means for forming printing characters on the printing section of such a device, an embossing machine carriage for supporting and automatically advancing such a printing section with relation to said embossing means, a plurality of punches for forming codal control data on said control section, a punch carriage for supporting and automatically advancing the control section with relation to said punches, means for selecting said punches in accordance with a predetermined number code, actuating means for said punches rendered operable automatically upon such selection of one or more of said punches, said embossing means including means for forming numbers on said printing section to provide either address or supplemental data thereon, manually actuatable means operable to select and cause embossing operation of said number forming means, means controlled by said selecting means of the embossing machine and operable simultaneously to select and cause operation of said punches in accordance with said number code to form control data on said control section corresponding to the numerical data thus selected and formed on the printing section.

7. A machine for forming printing and control devices having separably related printing and control sections, said machine comprising embossing means for forming printing characters on the printing section of such a device, an embossing machine carriage for supporting and automatically advancing such a printing section with relation to said embossing means, a plurality of punches for forming codal control data on said control section, a punch carriage for supporting and automatically advancing the control section with relation to said punches, said embossing means including means for forming numbers on said printing section to provide either address or supplemental data thereon, manually operable number selecting means operable to select and cause embossing operation of said number forming means, a common actuator for said punches, selector bars individually shiftable from normal inoperative positions to operative positions for rendering said actuator operable selectively with respect to said punches, means for selectively shifting each of said selector bars to its operative position, said means including a transmitting element for each selector bar, key controlled means mechanically operable upon said transmitting elements to actuate said elements to their operative positions in accordance with a predetermined number code, a control element operable to initiate a cycle of operation of said actuator upon actuation of one of said transmitting elements, electrically operable means controlled by the number selecting means of said embossing machine for actuating said transmitting elements selectively in accordance with said code and independently of said key controlled means, means operable automatically at the end of a cycle of operation of said actuator to positively restore said selector bars to their inoperative positions, safety latch means operable in the event that any one of said transmitting elements is in its actuated position during such a restoring operation to latch said selector bars in their inoperative positions, means operable automatically to space said punch carriage upon completion of a cycle of operation of said actuator, manually operable means to space said punch carriage, electrical means controlled by said number selecting means of the embossing machine and operable to space said carriage independently of the operation of said actuator, and a conditioning means operable to render said electrical means operative.

8. A machine for forming printing and control devices having separably related printing and control sections, said machine comprising embossing means for forming printing characters on the printing section of such a device, an embossing machine carriage for supporting and automatically advancing such a printing section with relation to said embossing means, a plurality of punches for forming codal control data on said control section, a punch carriage for supporting and automatically advancing the control section with relation to said punches, said embossing means including means for forming numbers on said printing section to provide either address or supplemental data thereon, manually operable number selecting means operable to select and cause embossing operation of said number forming means, a common actuator for said punches, selector bars individually shiftable from normal inoperative positions to operative positions for rendering said actuator operable selectively with respect to said punches, means for selectively shifting each of said selector bars to its operative position, said means including a transmitting element for each selector bar, key controlled means mechanically operable upon said transmitting elements to actuate said elements to their operative positions in accordance with a predetermined number code, a control element operable to initiate a cycle of operation of said actuator upon actuation of one of said transmitting elements, electrically operable means controlled by the number selecting means of said embossing machine for actuating said transmitting elements selectively in accordance with said code and independently of said key controlled means, means operable automatically to space said punch carriage upon completion of a cycle of operation of said actuator, manually operable means to space said punch carriage, electrical means controlled by said number selecting means of the embossing machine and operable to space said carriage independently of the operation of said actuator, and a conditioning means operable to render said electrical means operative.

9. In a machine for forming code bearing control devices in accordance with a five element number code, the combination of five forming members corresponding to the five elements of the code, a series of number keys from 1 to 9, individually operable actuating means for said forming members, control means for said actuating means operable by said number keys to effect actuation of a first one of said forming members when either the "1" or the "2" key is actuated, to effect actuation of a second one of said forming members when either the 3 or the 4 key is actuated, to effect actuation of a third one of said forming members when either the 5 or the 6 key is actuated, to effect actuation of a fourth one of said forming members when either the 7 or the 8 key is actuated, and to effect actuation of the fifth one of said forming members when any odd numbered key is actuated.

10. In a machine for forming control devices bearing coded numerical data, the combination of a first forming member operable to form on such a device a distinguishing indication which when formed alone represents a given number, a plurality of other forming members each operable to form on such device indications each of which when formed alone represents a selected number of a first class and a selected number of a second class when formed in combination with said distinguishing indication, a plurality of number keys, means for causing actuation of said first forming member controlled by the key bearing said given number, and by all keys bearing numbers of said second class, and means for causing actuation of each of said other forming members, each of said means being controlled by two of said keys bearing numbers falling in said different classes.

11. In a machine for forming control devices bearing numerical control data coded in a five position number code, said machine having five forming members corresponding to the five positions of the code, a plurality of control keys bearing numbers from "1" to "9" inclusive, actuating means for said forming members, and control means for said actuating means comprising a transmitting element actuated by all of the odd numbered keys to cause operation of a first one of said forming members, four transmitting elements each operable to cause operation of an associated one of the other forming members, and means whereby each of said four transmitting elements is actuated by a predetermined odd numbered key or a predetermined even numbered key.

12. A machine of the character described for forming control devices bearing numerical control data physically represented on such devices in accordance with a five position number code, said machine comprising five punches, means for selectively actuating said punches including five selector elements each governing the actuation of one of the punches, a plurality of number keys bearing figures from "1" to "9", and means operatively connecting said keys in pairs to four of said selector elements, and means operatively connecting one key of each pair and the other or remaining key to the fifth one of said selector elements.

13. In a machine for forming control devices in accordance with a five element positional code of numbers, the combination of five punches, actuating means therefor, control means for said actuating means comprising a plurality of selector members, one for each punch, a plurality of transmitting members each operatively connected to one of said selector members, a plurality of number keys bearing the several numbers from "1" to "9", means operatively associating one of said transmitting members with all of the odd numbered keys for actuation thereby, and means operatively associating each of the other transmitting members with a different pair of number keys for actuation thereby, each such pair including one even numbered key and one odd numbered key.

14. In a machine for forming control devices in accordance with a five element positional code of numbers, the combination of five punches, actuating means therefor, control means for said actuating means comprising a plurality of selector members, one for each punch, a plurality of transmitting levers pivoted on a common axis, a plurality of number keys carried on corresponding ends of supporting levers pivoted on said axis and bearing the several numbers from "1" to "9", means operatively associating one end of the transmitting lever of one of the odd numbered keys to cause actuation thereof when said one of the odd numbered keys is actuated, the other end of said one transmitting lever being in the form of a bail overlying projecting ends of all of the other odd numbered keys for actuation by any one of said odd numbered keys, means operatively associating each of said other odd numbered keys and the even numbered keys with the other four transmitting levers in pairs, each pair comprising an odd and an even numbered key, and means operatively associating each transmitting lever with one of said selector members.

15. A machine for forming control devices, said machine comprising a plurality of punches, a carriage for supporting and advancing such a device with relation to said punches, a common actuator for said punches, selector bars individually shiftable from normal inoperative positions to operative positions for rendering said actuator operable selectively with respect to selected ones of said punches, means for individually shifting each of said selector bars to its operative position, said means including a transmitting element for each selector bar, key controlled means mechanically operable upon said transmitting elements to actuate said elements selectively to their operative positions in accordance with a predetermined number code, a control element operable to initiate one cycle of operation of said actuator upon actuation of one of said transmitting elements, electrically operable means for actuating said transmitting elements selectively in accordance with said code and independently of said key controlled means, means operable automatically at the end of a cycle of operation of said actuator to positively restore said selector bars to their inoperative positions, safety latch means operable in the event that any one of said transmitting elements is in its actuated position during such a restoring operation to latch said selector bars in their inoperative positions, means operable automatically to space said carriage upon completion of a cycle of operation of said actuator, manually operable means to space said carriage, and electrically operable means to space said carriage independently of the operation of said actuator.

16. A machine for forming control devices, said machine comprising a plurality of punches, a carriage for supporting and advancing such a device with relation to said punches, automatic spacing means for advancing said carriage, a common actuator for said punches, selector bars individually shiftable from normal inoperative positions to operative positions for rendering said actuator operable selectively with respect to said punches, means for shifting each of said selector bars to its operative position, said means including a transmitting element for each selector bar, key controlled means mechanically operable upon said transmitting elements to actuate said elements to their operative positions in accordance with a predetermined number code, control means operable to initiate a cycle of operation of said actuator as an incident to the actuation of one of said selector bars, means operable automatically at the end of a cycle of operation of said actuator to positively restore said selector bars to their inoperative positions, and safety latch means operable in the event that any one of said transmitting elements is in its actuated position during such a restoring operation to latch said selector bars in their inoperative positions.

17. A machine of the character described for forming control devices, said machine comprising a plurality of punches, means for supporting and automatically advancing such a device with relation to said punches, a common actuator for said punches, a plurality of selector bars individually shiftable from normal inoperative positions to operative positions for rendering said actuator operable selectively with respect to said punches, said bars at one end being supported and guided on said actuator and each of said ends being adapted in the operative position of its bar to be located between said actuator and its associated punch, means for shifting each of said bars including a bell crank having one arm supporting the other end of its selector bar, a plurality of transmitting elements, one for each selector bar, a Bowden cable operatively interposed between each transmitting element and the other arm of one of said bell cranks, a plurality of number keys mechanically operable upon said transmitting elements to actuate said elements to their operative positions in accordance with a predetermined number code, and a control element operable to initiate a cycle of operation of said actuator upon actuation of any one of said transmitting elements.

18. A machine for forming control devices, said machine comprising a plurality of punches, a carriage for supporting and automatically advancing such a device with relation to said punches, a common actuator for said punches, selector elements individually shiftable from normal inoperative positions to operative positions for rendering said actuator operable selectively with respect to said punches, means for shifting each of said selector elements to its operative position, said means including a transmitting element for each selector bar, key controlled means mechanically operable upon said transmitting elements to actuate said elements to their operative positions in accordance with a predetermined number code, and control means operable to initiate a cycle of operation of said actuator as an incident to the actuation of one of said selector elements.

19. A machine of the character described for forming control devices, said machine comprising a plurality of punches, a carriage for supporting and automatically advancing such a device with relation to said punches, actuating means for said punches including a plurality of selector elements individually shiftable from normal inoperative positions to operative positions for rendering said actuating means operable selectively with respect to said punches, means for shifting each of said selector elements including a Bowden cable operatively associated with said selector elements, a plurality of depressible number keys, and means actuated by said keys and mechanically operable upon said cables to actuate said cables in accordance with a predetermined number code.

20. A machine for forming control devices, said machine comprising a plurality of punches, a carriage for supporting and advancing such a device with relation to said punches, escapement means for advancing said carriage, a common actuator for said punches, a main operating shaft from which said actuator is driven, means including a one-revolution clutch for driving said shaft, selector bars individually shiftable from normal inoperative positions to operative positions for rendering said actuator operable selectively with respect to said punches, means for shifting each of said selector bars to its operative position, said means including a transmitting element for each selector bar, a plurality of number keys mechanically operable upon said transmitting elements to actuate said elements to their operative positions in accordance with a predetermined number code, control means actuated by depression of any one of said number keys and operable upon said clutch to initiate a cycle of operation of said operating shaft, means operable automatically at the end of a cycle of operation of said operating shaft to positively restore said selector bars to their inoperative positions, and means on said shaft and operable on said escapement to space said carriage at the end of a punching operation.

21. In a machine of the character described, the combination of a work holder for holding a flat work piece, said work holder having opposed parallel grooves adapted to slidably embrace opposite edges of such a work piece and into which such a work piece may be inserted in a loading direction to a working position in said guide means, a yielding unloading member resisting such loading movement of the work piece and tending to impart an unloading movement thereto, a V-shaped latch member adapted to engage a V-shaped notch in one of said edges of such a work piece to retain it in said working position against the yielding unloading force of said unloading member, and spring actuated cam means operable to shift said latch member to its operative position and to maintain it in said operative position.

22. In a machine of the character described, the combination of a work holder having a guide into which a work piece may be inserted in a loading direction to a working position, a yielding unloading member resisting such loading movement of the work piece and tending to discharge such work piece from said working position, a latch member operable to retain a work piece in such a working position, and means controlled by said unloading member to shift said latch to its operative relation to a work piece, said last mentioned means being manually actuatable to release said latch member and permit operation of said unloading member.

23. In a work holder of the character described for holding flat work pieces, the combination of a guide having means adapted to slidably engage opposite edges of the work piece and into which a work piece may be inserted in a loading direction to an operative working position, a latch member having a V-shaped tooth operable to engage a V-shaped notch in one of said edges of the work piece and thereby secure the work piece in said working position, a control plunger yieldingly urged in one direction, cam means operable upon movement of said plunger in said direction to shift said latch member to its operative latching relation to such a work piece, and a detent member yieldingly urged to a position to retain said plunger in its inoperative position, said detent member having an arm positioned in the path of loading movement of a work piece and operable by such movement of the work piece to release said detent member and permit operative movement of said control plunger.

24. In a work holder, the combination of a guide into which a work piece may be inserted in a loading direction to an operative working position, a yielding unloading member acting to resist such loading movement and tending to unload said work piece, a latch member operable to latch said work piece in said working position against the unloading action of said unloading member, a control plunger yieldingly urged in one direction, cam means operable upon movement of said plunger in said direction to shift said latch member to its operative latching relation to such a work piece, and means operable by said unloading member to retain said plunger in its inoperative position while said unloading member is inactive and to release said plunger when the insertion of a work piece into said guide acts to shift said unloading member.

25. In a machine of the character described, the combination of a work holder comprising guide means into which a work piece may be inserted in a loading direction to a working position in said guide means, a yielding unloading member resisting such loading movement of the work piece and tending at all times to impart an unloading movement thereto, a latch member for engaging such a work piece to retain it in said working position against the unloading force of said unloading member, and means for shifting said latch member to its operative position.

26. In a machine of the character described, the combination of a work holder having a guide into which a work piece may be inserted in a loading direction to a working position in said guide, a yielding unloading member resisting such loading movement of the work piece and tending to discharge such work piece from said working position, a latch member operable to retain a work piece in such working position, and means controlled by said unloading member to shift said latch member to its operative position.

27. A machine for forming control devices, said machine comprising a plurality of punches, a carriage for supporting and advancing such a device with relation to said punches, escapement means for advancing said carriage, a common actuator for said punches, a main operating shaft from which said actuator is operated, means for driving said shaft through an operating cycle, selector bars individually shiftable from normal inoperative positions to operative positions for rendering said actuator operable selectively with respect to said punches, means for shifting each of said selector bars to its operative position, said means including a transmitting element for each selector bar, a plurality of number keys mechanically operable upon said transmitting elements to actuate said elements to their operative positions in accordance with a predetermined number code, control means actuated by depression of any one of said number keys and operable upon said shaft-driving means to initiate a cycle of operation of said operating shaft, means operable automatically at the end of a cycle of operation of said operating shaft to actuate said selector bars with an unyielding force thereby to positively restore said selector bars to their inoperative positions, and means on said shaft and operable on said escapement to space said carriage at the end of a punching operation.

WALTER T. GOLLWITZER.